(12) United States Patent
Pickens et al.

(10) Patent No.: US 7,844,174 B2
(45) Date of Patent: Nov. 30, 2010

(54) SYSTEM AND METHOD FOR MANUAL SELECTION OF MULTIPLE EVALUATION POINTS FOR CAMERA CONTROL

(75) Inventors: Jeremy Pickens, Milpitas, CA (US); Anthony Dunnigan, Berkeley, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 250 days.

(21) Appl. No.: 12/221,312

(22) Filed: Jul. 31, 2008

(65) Prior Publication Data
US 2010/0027983 A1 Feb. 4, 2010

(51) Int. Cl.
G03B 13/36 (2006.01)
G03B 17/18 (2006.01)
(52) U.S. Cl. .................. 396/121; 396/147; 396/234; 396/296
(58) Field of Classification Search .................. 396/121, 396/147, 296
See application file for complete search history.

(56) References Cited

U.S. PATENT DOCUMENTS

| | | | | |
|---|---|---|---|---|
| 4,829,331 | A * | 5/1989 | Aihara | 396/121 |
| 5,128,705 | A | 7/1992 | Someya et al. | |
| 5,555,068 | A * | 9/1996 | Utagawa | 396/121 |
| 5,640,619 | A | 6/1997 | Takayama et al. | |
| 5,692,222 | A * | 11/1997 | Yamada et al. | 396/51 |
| 6,801,717 | B1 | 10/2004 | Hofer | |
| 7,646,972 | B2 * | 1/2010 | Dunko et al. | 396/121 |
| 2002/0037166 | A1 * | 3/2002 | Nagahata et al. | 396/121 |
| 2008/0079837 | A1 * | 4/2008 | Masubuchi | 348/345 |

OTHER PUBLICATIONS

Canon EOS-1D Mark III, http://www.usa.canon.com/consumer/controller?act=ModelInfoAct&fcategoryid=139&modelid=14999, retrieved Jul. 30, 2008.
Nikon d-80, http://nikonimaging.com/global/products/digitalcamera/slr/d80/index.htm, retrieved Jul. 30, 2008.
Sony High Definition Handycam Camcorder HDR-CX7, http://www.sonystyle.com/webapp/wcs/stores/servlet/ProductDisplay?catalogId=10551&storeId=10151&Ia ngId=-1&productId=8198552921665089063, retrieved Jul. 30, 2008.
http://www.luminous-landscape.com/tutorials/dep.shtml, retrieved Jul. 21, 2008.

* cited by examiner

*Primary Examiner*—W. B. Perkey
(74) *Attorney, Agent, or Firm*—Sughrue Mion, PLLC

(57) ABSTRACT

A method and system for additively, manually sequentially or manually in parallel, selecting multiple points or regions of interest in the analog or digital viewfinder of a photo or video camera with automatic controls like auto-focusing, auto-metering and auto white-balancing. Points or regions capable of being selected, within a grid of elements comprising a camera's evaluative matrix and represented to the user in a viewfinder or other display, may be hard-coded (pre-defined, selectable regions) or any point, pixel, or group of pixels. Data from the selected regions is used to simultaneously, dynamically adjust focus related parameters, light metering and white balancing of the camera and is tied into these features. Point selection may be via touch screen or by holding down a lock button. The selected points or regions may be applied to focus and aperture related adjustments or for any other camera function related to measurement of the scene.

23 Claims, 19 Drawing Sheets
(7 of 19 Drawing Sheet(s) Filed in Color)

SYSTEM AND METHOD FOR MANUAL SELECTION OF MULTIPLE EVALUATION POINTS FOR CAMERA CONTROL

BACKGROUND

1. Field of the Invention

This invention generally relates to control of photo or a video camera and, more particularly, to selecting the focus, exposure, white balance, or any other automatic camera control, in the viewfinder or image display area of analog and digital still and video cameras.

2. Description of Related Art

Modern cameras, such as film point-and-shoot cameras, film single-lens-reflex cameras (SLR), digital point-and-shoot cameras, and digital SLR cameras, include a number of built-in sensor options that assist camera users with the photographic process. Examples of these options include automatic focus, automatic metering with automatic aperture and/or shutter speed control and automatic white balance adjustment.

In modern cameras, despite the fact that focus, metering, and the like are automated, the automation is not applied indiscriminately. For example, in a camera with multiple autofocus points, a user often has two choices: (1) let the camera automatically select multiple focus points to put the entire scene into focus, or (2) let the photographer manually select a single autofocus point or region which includes multiple contiguous points, and use the single point or region for autofocus. Similar interfaces exist for metering, and to a lesser extent for white balance; the user may either select all metering zones or one metering zone. The above conventional methods are referred to as A-DEP, for automatic depth of field, and DEP, for simply depth of field, and are further described below.

The problem is that these two choices often do not allow the user sufficient control. A single focus point might put the primary subject or the front of a subject into focus, but leave the secondary subject blurred. On the other hand, a camera-selected all-focus-points option while putting both the primary and secondary subjects in focus may put the background into focus, as well. This is usually undesirable as one often wishes to isolate the background from the main subjects of the photograph in order to achieve a more desirable overall photographic composition.

A third option, provided in certain cameras with a depth of field mode option, allows the photographer to point the camera towards a first point of focus and indicate this point to the camera and then towards a second point of focus and indicate the second point to the camera as well. The camera provides autofocus on the image based on the two points provided to the camera sequentially. However, this approach requires extra time and effort on the part of the user.

Thus, the conventional industry approaches are deficient in their ability to facilitate speedy selective focusing on subjects in analog and digital still and video cameras.

SUMMARY OF THE INVENTION

There is a need by practitioners in the art of photography for manual selection of multiple arbitrary (non-contiguous) measuring points or regions, in order to produce a photo that more closely reflects the intention of the photographer than the automatic selection of points by the camera.

The inventive methodology is directed to methods and systems that substantially obviate one or more of the above and other problems associated with conventional techniques for focus point selection, metering region selection, white balance area selection, and any other evaluative, measuring functionality built into still and video cameras.

Aspects of the present invention provide a system and a method for manual selection of multiple points or multiple zones, and tying the results of the multiple selection into a camera's automatic focus, metering, white balance, or any other metered controls. While it is possible for the photographer to manually calculate proper values, such as the necessary focus distances and apertures to achieve the desired outcome, aspects of the present invention provide an improvement over manual calculation methods. The methods provided according to the aspects of the present invention, are simpler, require fewer steps and do not require knowledge of how the photographic equipment works. According to these methods, a user determines on which subjects he wants the camera to focus and the system makes the appropriate adjustments to the camera's settings accordingly.

Aspects of the present invention also provide methods and systems for additively and manually selecting regions of interest in an analog or digital viewfinder of a photo or video camera with automatic controls, for example auto-focusing, auto-metering, and auto-white-balancing. By providing better region-of-interest data, aspects of the present invention enable an automatic camera to provide one or more of the following features: to more accurately adjust these settings in order to keep desired subjects in focus by adjusting the aperture, to more accurately meter an entire scene, to more accurately achieve correct white balance for an entire scene, or to adjust any other setting that depends upon the analysis of multiple regions of interest.

Aspects of the present invention provide a method for parallel, i.e. simultaneous, processing of measurements taken at multiple non-contiguous points, after a manual selection of those multiple points has taken place. For example, a touch-sensitive screen interface may include metering or measuring points or regions. Regions are formed from having a group of contiguous points. The points and the regions may be either discrete or continuous. Arbitrary selection occurs when the user is given the ability to manually active or deactivate multiple metering points or groups of points, independent of the location of these points; i.e. the points may be non-contiguous. Multiple regions or points may be selected in parallel or alternatively they may be selected sequentially and one after the other. If a user touches a touch-sensitive screen view finder simultaneously at several points or regions, then the selection of the points occurs in parallel. However, whether selected in parallel or sequentially, the points or regions are processed by the device simultaneously. After a user has manually pre-selected multiple discrete measuring points or continuous regions, simultaneously or even sequentially, the processing and use of those points for measurement of a photographic scene is performed simultaneously.

Aspects of the present invention provide a device for parallel processing of data from selected points instead of sequential processing of data from each point after each point is selected. The selection of the points may be carried out simultaneously and in parallel or sequentially and one after the other. The points or regions that are capable of being selected, within a grid of elements that comprise a camera's evaluative matrix (and represented to the user in a viewfinder or other display), may be hard-coded (pre-defined, selectable regions) or any point, pixel, or group of pixels. A user may select two or more points. The data collected and processed, may be focusing data or other types of metering data.

On the other hand, in the conventional method of DEP both selection and processing are sequential. The conventional method of DEP works by processing data from a single point that the user has selected. As a result, each selection is followed by processing of data from the selected point. Selection is sequential and processing is also sequential. The user must point the camera in multiple directions sequentially, each time obtaining one single point. The camera then uses the accumulation of these multiple, sequential measurements to calculate settings for a scene. Accordingly, in DEP, the focus is selected by selecting the points and then if the subjects that were located at the selected points move, they will be out of focus. This is in contrast to the aspects of the present invention, where the points or regions are selected and the focus and other metering data are calculated simultaneously (upon, for example, shutter lock).

Aspects of the present invention provide a method for processing of data from multiple measurement points on a viewfinder of a camera. The method includes receiving a manual selection of a first measurement point on the viewfinder at a first time, receiving a manual selection of a second measurement point on the viewfinder at a second time, and, at a third time, simultaneously processing data from a scene, being viewed through the viewfinder, corresponding to the first measurement point and to the second measurement point. The simultaneously focusing is responsive to a current situation of the scene at locations corresponding to the first measurement point and to the second measurement point, the current situation corresponding to the third time. The first time and the second time may be the same or different and the third time may be the same as the second time or a different time. The first measurement point and the second measurement point on the viewfinder may be selected from predetermined hard-coded points. The first measurement point and the second measurement point may be regions each including a plurality of contiguous points.

The method may be tied into an automatic focus feature of the camera, and may further include automatically adjusting a focus distance of the camera according to the selected points, and automatically adjusting an aperture of the camera according to the focus distance. The method may be tied into a metering feature of the camera and may further include automatically adjusting exposure of the camera according to light or white balance detected at each of the selected points. The selected points may be de-selected when the selected point is re-selected by the user. Re-selections of a selected point operates like a toggle.

Aspects of the present invention include a screen for showing an image to a user, an input interface for receiving multiple inputs from the user, the multiple inputs indicating selected points on the device, and a locking means for locking the selected points. The multiple inputs are provided to the device manually by the user, and data corresponding to the multiple inputs are processed in parallel by the device. The selected points may be selected from among autofocus points presented by the device or may correspond to arbitrary or hard-coded regions.

Aspects of the present invention provide a camera including the devices described above and capable of performing the methods described above. The camera may be a digital or analog still (photography) camera, a digital or analog motion (video or film) camera or a combination of them. The selected points may correspond to regions on the device. The regions are within a grid of elements comprising a camera's evaluative matrix and are represented to the user in a viewfinder or other display, either hard-coded or any point, pixel, or group of pixels.

Additional aspects related to the present invention will be set forth in part in the description which follows, and in part will be obvious from the description, or may be learned by practice of the present invention. Aspects of the present invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The patent or application file contains at least one drawing executed in color. Copies of this patent or patent application publication with color drawings will be provided by the Office upon request and payment of the necessary fee.

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1A:
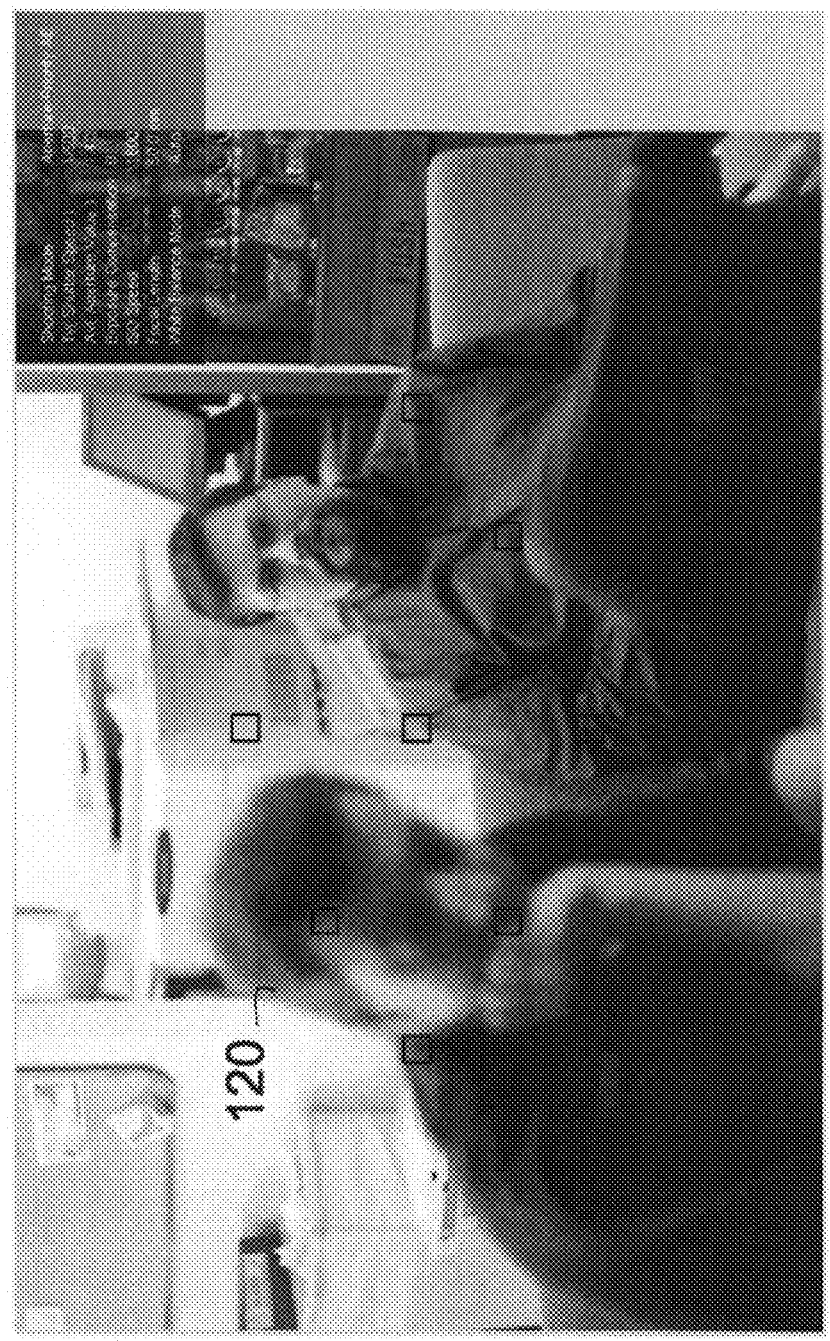
FIG. 1A and FIG. 1B show a view seen in a conventional view finder where a focus on a far subject places a near subject out of focus.

In the following detailed description, reference will be made to the accompanying drawings, in which identical functional elements are designated with like numerals. The aforementioned accompanying drawings show by way of illustration and not by way of limitation, specific embodiments and implementations consistent with principles of the present invention. These implementations are described in sufficient detail to enable those skilled in the art to practice the present invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the present invention as described may be implemented in the form of a software running on a general purpose computer, in the form of a specialized hardware, or combination of software and hardware.

Aspects of the present invention provide novel methods for selecting multiple points or zones of focus in a viewfinder of a camera and novel methods for tying the selected points of focus to existing functionalities of a camera that includes the view finder.

Aspects of the present invention further provide a viewfinder that allows selection of multiple points of focus in a manual and parallel fashion. This selection may be achieved in several different ways that fall within the aspects of the present invention. Aspects of the present invention further provide a camera including the view finder of the present invention and having its functionalities tied to the view finder of the present invention.

Parallel selection in the context of this description means that while a photographer may touch or otherwise select the points of focus sequentially or simultaneously, the selections are conveyed to the camera substantially together, i.e. substantially in parallel, in order to obtain points of focus that are used together in the same camera shot or frame. In other words, while the user may select points or regions sequentially, by the time the camera is in a situation where it needs to utilize these metering points, for example to determine focus or exposure or white balance, all user-selected points are accessed by the camera substantially at one point in time. As such, the data from the selections are utilized functionally in parallel.

In one aspect of the present invention, parallel point selection is achieved via a touch interface. Many cameras include LCD screens that show real-time charge-coupled device (CCD) or CMOS sensor images of the scene about to be photographed. In one aspect of the present invention, the LCD panel includes a touch-sensitive capability which enables the user to select points or zones or even arbitrary regions on the real-time image by pressing or swiping a finger across the touch-sensitive screen. Points or regions selected in this manner may be added to a set or group of metering points or metering regions for determining focus, exposure, white balance points, or the like. This aspect of the present invention is applicable to images captured by still photography cameras, video cameras or film cameras. When used in video or film cameras, adjustments to the focus of the image may be made "on the fly" as subjects or the camera move during filming.

In another aspect of the present invention, parallel point selection is achieved via a lock button. This aspect of the present invention for multiple-point or multiple-zone selection is capable of taking advantage of a camera's built in single-point selection mode. In the single-point selection mode for a camera that features multiple points or zones that are measured automatically by the camera, a user may select a single point. Aspects of the present invention provide a system and a method where multiple-point selection is achieved by activating a "multi-lock" button as each new point is selected. In one aspect, activating the multi-lock button while selecting an already-selected point would then turn that point off.

Current cameras with, for example, multiple autofocus points incorporate focusing based on information from multiple points. Aspects of the present invention enable the camera operator to select some or all of these multiple points manually. This change to the input of the camera enables the focus points to be used in different ways. The parallel point selection methods and systems of the present invention yield selected points. The selected points may be tied to various features of the camera. Aspects of the present invention provide various methods for tying the parallel point selection methods and systems of the present invention to features of the cameras.

In one aspect of the present invention, the selected points may be tied to focus and aperture of the camera. In another aspect, the selected points may be tied to multiple metering points or zones selected by the camera. In yet another aspect, the selected points may be tied to auto white balance (AWB) of the camera.

Tying multiple focus points to focus and aperture is one aspect of the present invention as recited above. Once multiple focus points have been manually selected, according to aspects of the present invention, the camera can use those focus points to compute hyperfocal distance. While hyperfocal focusing is possible using other cameras, the aspects of the present invention permit the user to manually select the regions of interest.

For calculating hyperfocal distance, the focus distance is set to the midpoint of distance extremes and the aperture is narrowed only to a degree sufficient to put all subjects into focus. This has the desired effect of keeping the subjects of interest to the photographer in focus while leaving the background out of focus. In one example, three manually-selected focus points correspond to detected subjects at 5 feet, 9 feet, and 10 feet distances from the camera. The focus distance would therefore be set to 7.5 feet which is the average of the distance to the nearest and the farthest subjects, and the aperture would be narrowed so that the depth-of-field (DOF) is 5 feet. The aperture is lens-specific. Allowances could be made for slight DOF padding at the extremes, so the aperture could be set for a DOF of 7 or 8 feet, instead of 5 feet. If only a single point of focus was selected, the photographer would have had to focus either on the front or the back subject. However, using the averaged focus distance, the DOF would be less than the requisite 10 feet required for all subjects to be in focus. This allows the photographer to retain the advantages of a blurred background.

Tying multiple metering points or zones to metering features of the camera is another aspect of the present invention. Once multiple metering points or zones have been selected, the camera can take an average of all meter readings to determine the final exposure. Many conventional cameras include a feature directed to multiple-zone averaging where the average of readings of all of the zones is used or the reading value corresponding to a single zone is selected. The aspects of the present invention provide an additional feature where, the photographer may manually select a subset of the zones that are subsequently averaged in parallel. The zones may be selected by the user in parallel or sequentially. However, the metering itself is conducted in parallel, because of the ability to have manually selected multiple arbitrary points.

Tying multiple metering points to the auto white balance (AWB) is yet another aspect of the present invention. Similar to focus and metering, most modern cameras can evaluate a scene and automatically adjust the white balance based on the detected type of light. The light could correspond to a sunny or a cloudy day, to shade, or to a tungsten or florescent light. In some specific photographic scenes, more than one type of light may be present in an image. Conventional methods use only a single zone or a weighted average of the entire scene for white balance determination. Aspects of the present invention, on the contrary, are capable of tying manually-selected multiple metering zones to white balance. In other words, the automatic determination of white balance becomes a function of the selected zones.

An example illustrating manual multiple autofocus point selection is provided below. For each picture shown in the following figures, a caricaturized version is provided following the picture. Each picture, and its corresponding caricature, includes a far subject 110, a near subject 120, a background item 130 and nine camera autofocus points 141, 142, 143, 144, 145, 146, 147, 148 and 149. The nine autofocus points are automatically provided by the camera. Some cameras have the capability to automatically select some or all of the provided autofocus points. Aspects of the present invention permit manual selection of some or all of the autofocus points provided by the camera. The autofocus points selected for taking a photograph are selected autofocus points.

The following figures refer to two existing varieties of shooting modes. The two modes are both DOF modes that are used in some cameras existing on the market. These cameras permit the photographer to have the camera automatically select the hyperfocal distance and appropriate aperture for a particular shot, so that the nearest and farthest subjects in the scene are both in focus. One mode is referred to as a depth of field (DEP) mode and allows a user to sequentially select two, near and far, autofocus points and then the camera will automatically calculate the hyperfocal distance and set the focus point and aperture. The other mode is referred to as an automatic depth of field mode (A-DEP) and is an automatic version of the depth of field mode, where the camera automatically selects which of the autofocus points will actually be used for setting focus in a photograph. The DEP™ mode requires scene recomposition for each selection and for the final shot. The A-DEP mode does not require scene recomposition for each selection, but gives the user no control over selecting focus points.

While the example below is presented and described in the context of still photography, the concepts are applicable to video and film.

Further, while the example below is presented and described in the context of selecting focus points that are used for adjusting focus and aperture, the concepts are applicable to selection of points for light metering or to selection of points for auto white balancing.

Also, while the example below ends with selection of the points via a touch-sensitive screen feature, the concepts are applicable to other parallel selection methods such as using a lock button.

Figure 1B:
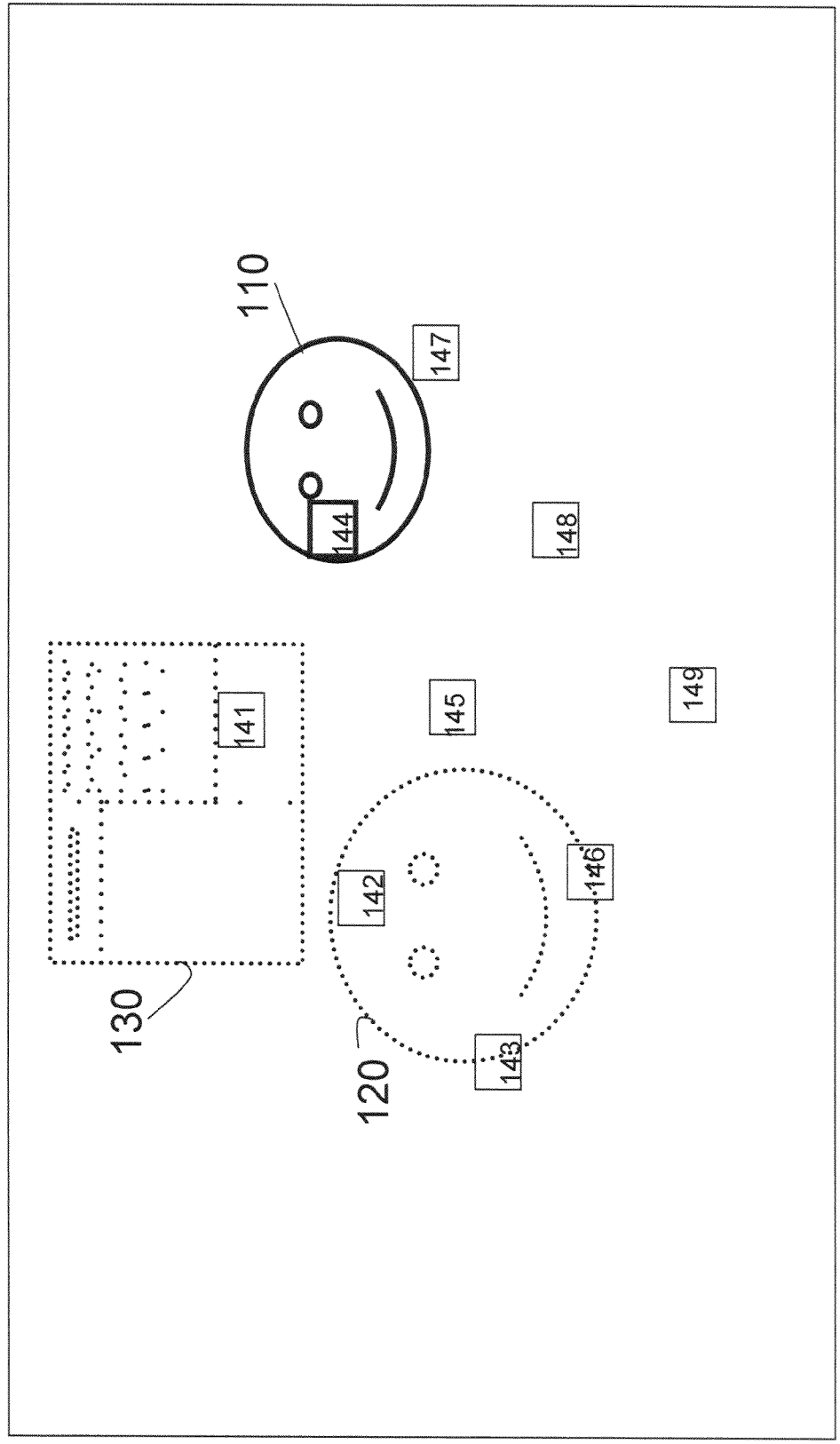

FIG. 1A and FIG. 1B show a view seen in a conventional view finder where a focus on a far subject places a near subject out of focus.

In the picture shown in FIG. 1A and caricaturized in FIG. 1B, the aperture is large, and focus on the far subject 110 places the near subject 120 out of focus. For example, for the picture shown in FIG. 1A an aperture with an f-number of 1.4 is used. As shown, the focus is on the far subject 110 which corresponds to the autofocus point 144, which is one of the autofocus points that have been automatically selected by the camera.

Further, for the picture shown in FIG. 1A, the shooting mode is set to Aperture-Priority AE and the Av (aperture value) is 1.4. The other merely exemplary values shown on the picture correspond to parameters such as the Tv (shutter speed) that is 1/500, the Exposure Compensation that is 0, the ISO speed is 1600, the focal length that is 50.0 mm and the White Balance Mode that is Auto.

Figure 2A:
FIG. 2A and FIG. 2B show a view seen in a conventional view finder where a focus on a near subject places a far subject out of focus.
Figure 2B:
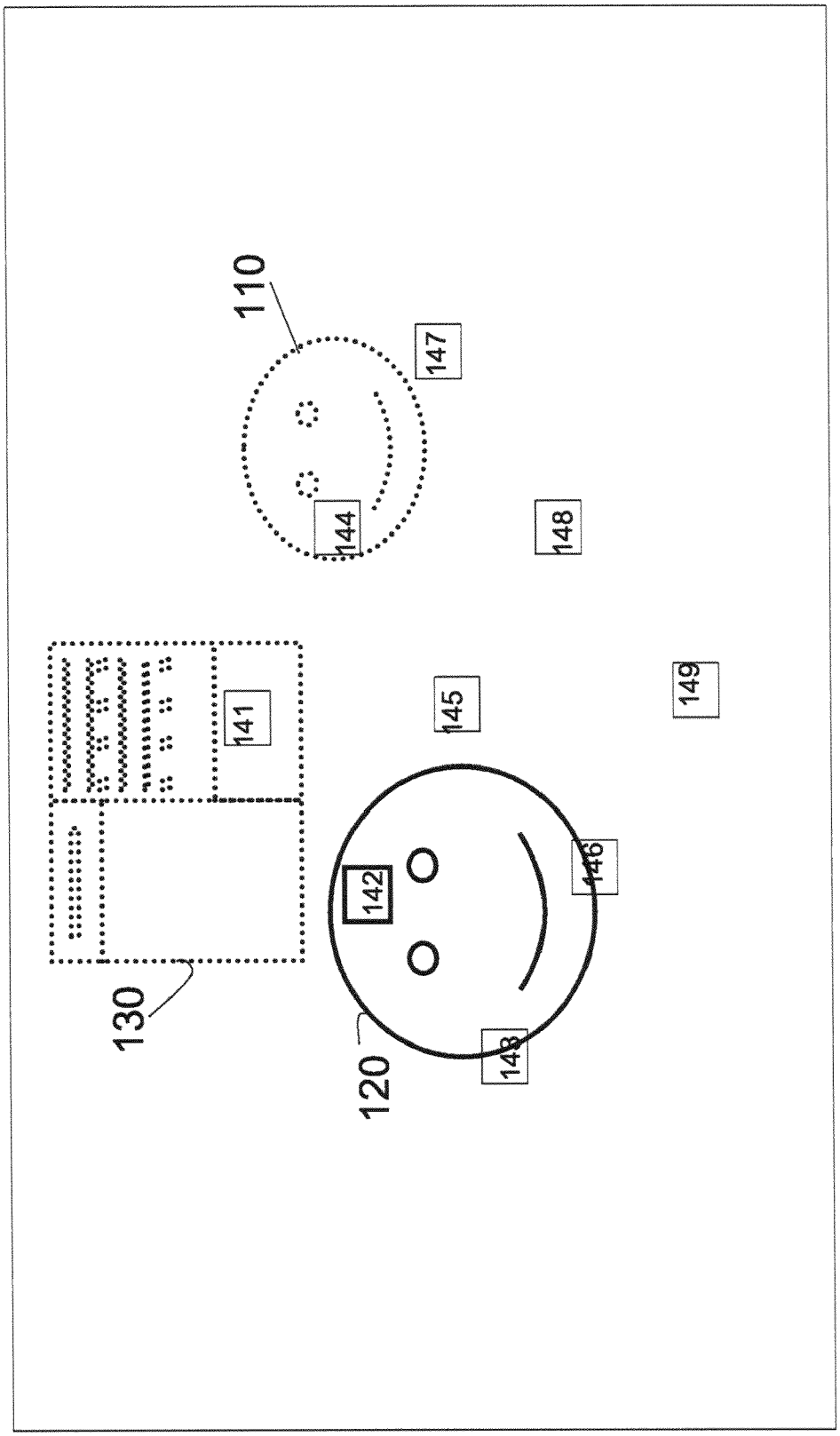

FIG. 2A and FIG. 2B show a view seen in a conventional view finder where a focus on a near subject places a far subject out of focus, due to the wide-open aperture of 1.4.

In the picture shown in FIG. 2A and caricaturized in FIG. 2B, the aperture remains the same large aperture of FIG. 1A. Here, focus on the near subject 120 places the far subject 110 out of focus. For the picture shown in FIG. 2A the same aperture with the f-number of 1.4 may also be used. As shown, the focus is on the near subject 120 which corresponds to the autofocus point 142, which is one of the autofocus points that were automatically selected by the camera.

For the picture shown in FIG. 2A, the shooting mode is set to Aperture-Priority AE and the Av (aperture value) is 1.4. The other merely exemplary values shown on the picture correspond to parameters such as the Tv (shutter speed) that is 1/400, the Exposure Compensation that is 0, the ISO speed that is 1600, the focal length that is 50.0 mm and the White Balance Mode that is Auto.

Figure 3A:
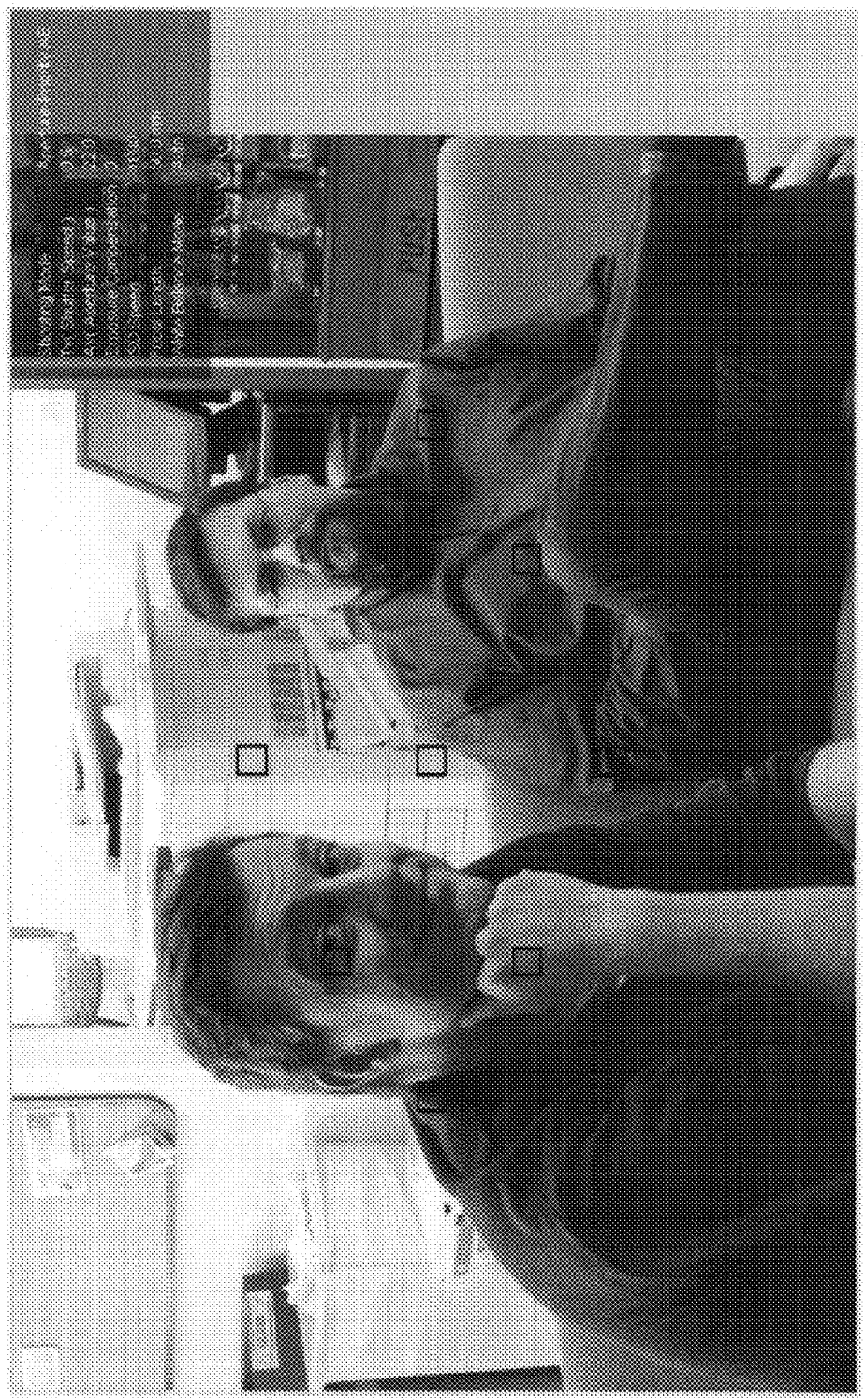
FIG. 3A and FIG. 3B show a view seen in a conventional view finder where both near and far subjects are in focus but the background is also in focus.
Figure 3B:
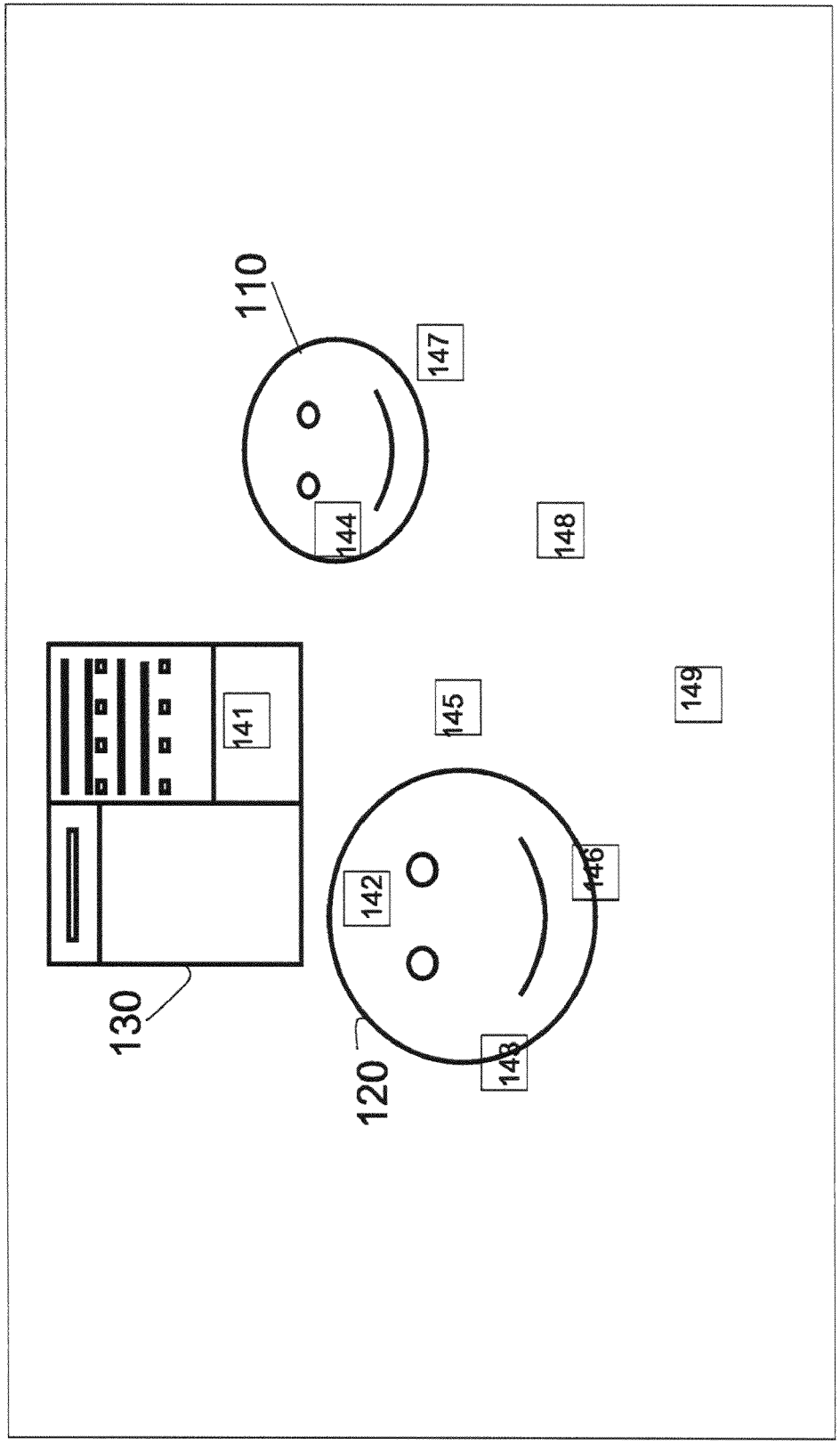

FIG. 3A and FIG. 3B show a view seen in a conventional view finder where both near and far subjects are in focus but the background is also in focus.

In the picture shown in FIG. 3A and caricaturized in FIG. 3B, the aperture is reduced to f-stop of 22. Here, focus is on the far subject 110, corresponding to the autofocus point 144. However, because of the small aperture, both subjects 110, 120 are in focus. The problem here is that not only are both subjects in focus, but the background item 130 is also in focus. The distracting background items 130, shown as a copy machine and garbage cans in the background of FIG. 3A, may not be part of the image the photographer wished to create.

For the picture shown in FIG. 3A, the shooting mode is set to Aperture-Priority AE and the Av (aperture value) is 22.0. The other merely exemplary values shown on the picture correspond to parameters such as the Tv (shutter speed) that is 0.5, the Exposure Compensation that is 0, the ISO speed that is 1600, the focal length that is 50.0 mm and the White Balance Mode that is Auto.

Figure 4A:
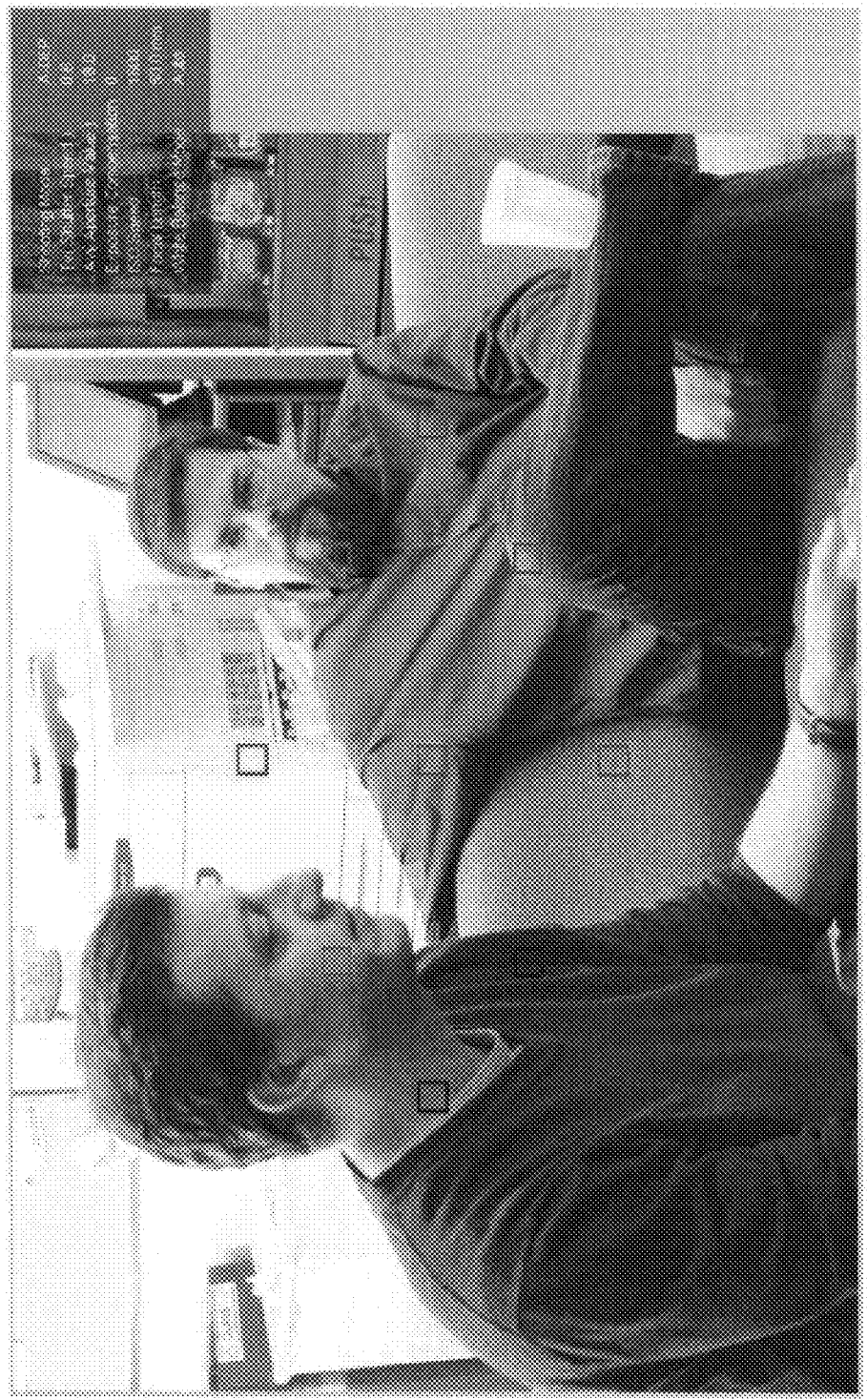
FIG. 4A and FIG. 4B show a view seen in a conventional view finder where the camera automatically selects which focus points are used to determine focus of the photograph.
Figure 4B:
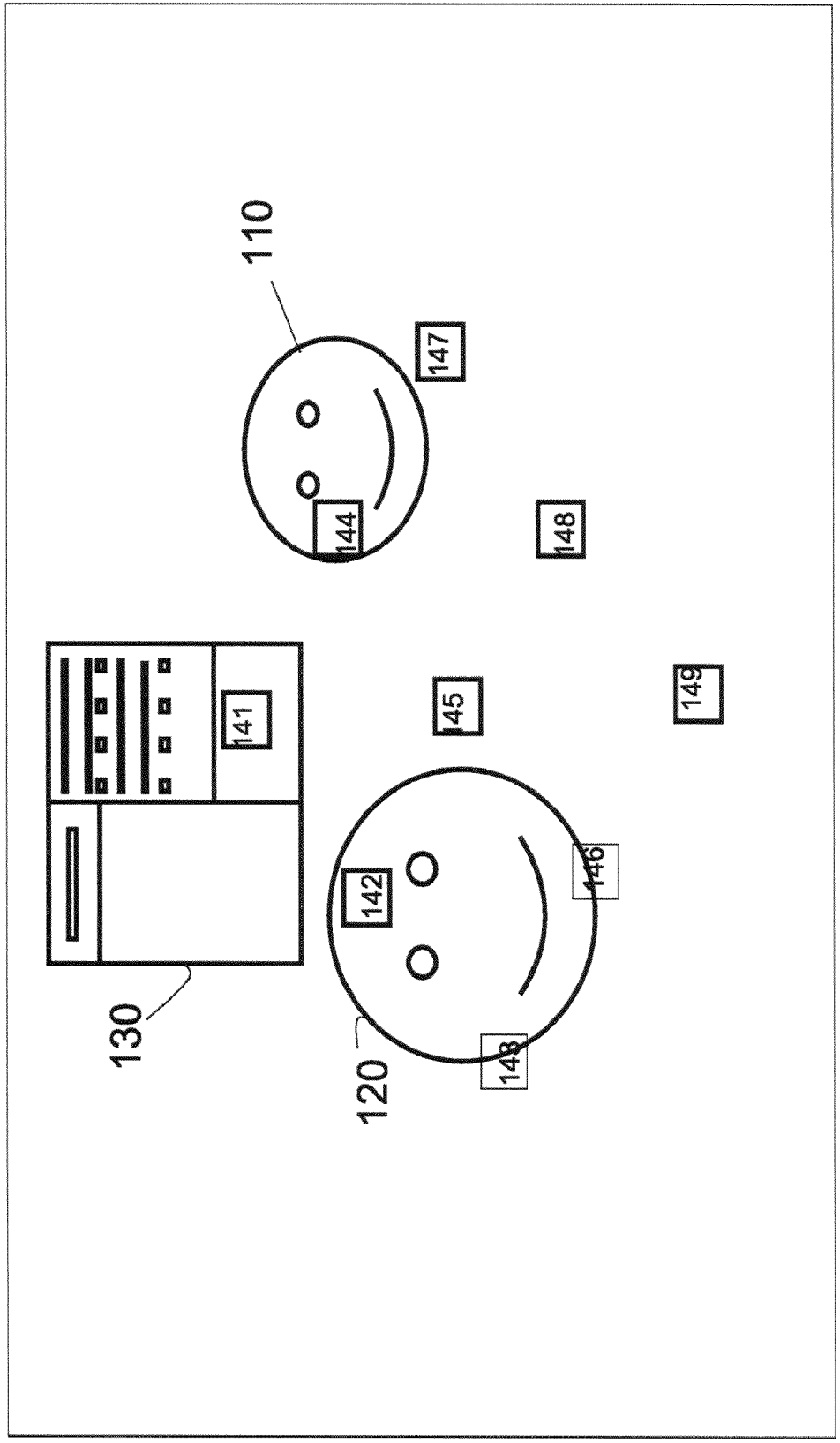

FIG. 4A and FIG. 4B show a view seen in a conventional view finder where the camera automatically selects which focus points are used to determine focus of the photograph.

In the picture shown in FIG. 4A and caricaturized in FIG. 4B, the aperture that has been automatically selected by the camera has an f-stop of 18. In the picture of FIG. 4A, the camera is permitted to automatically choose multiple points of focus, rather than using a single autofocus point. This corresponds to the A-DEP mode described above. However, with automatic selection of some of the autofocus points for focus by the camera, the distracting background item 130 is still in focus because one of the selected autofocus points falls on the background item 130.

In this case, seven of the nine autofocus points were selected by the camera to determine focus. The selected autofocus points are 141, 142, 144, 145, 147, 148 and 149. Autofocus point 141 which is one of the selected autofocus points falls on the copy machine 130 in the background. This is the problem with allowing the camera to automatically select multiple autofocus points. Because of this "incorrect" point of focus, the background item 130 is still in focus, which is not the desired outcome.

For the picture shown in FIG. 4A, the shooting mode is set to the automatic depth of field mode and the Av (aperture value) is 18.0. The other merely exemplary values shown on the picture correspond to parameters such as the Tv (shutter speed) that is 0.6, the Exposure Compensation that is 0, the ISO speed that is 1600, the focal length that is 50.0 mm and the White Balance Mode that is Auto.

One method of removing focus from the background item 130 is widening the aperture. The outcome of widening the aperture is shown in FIG. 5A.

Figure 5A:
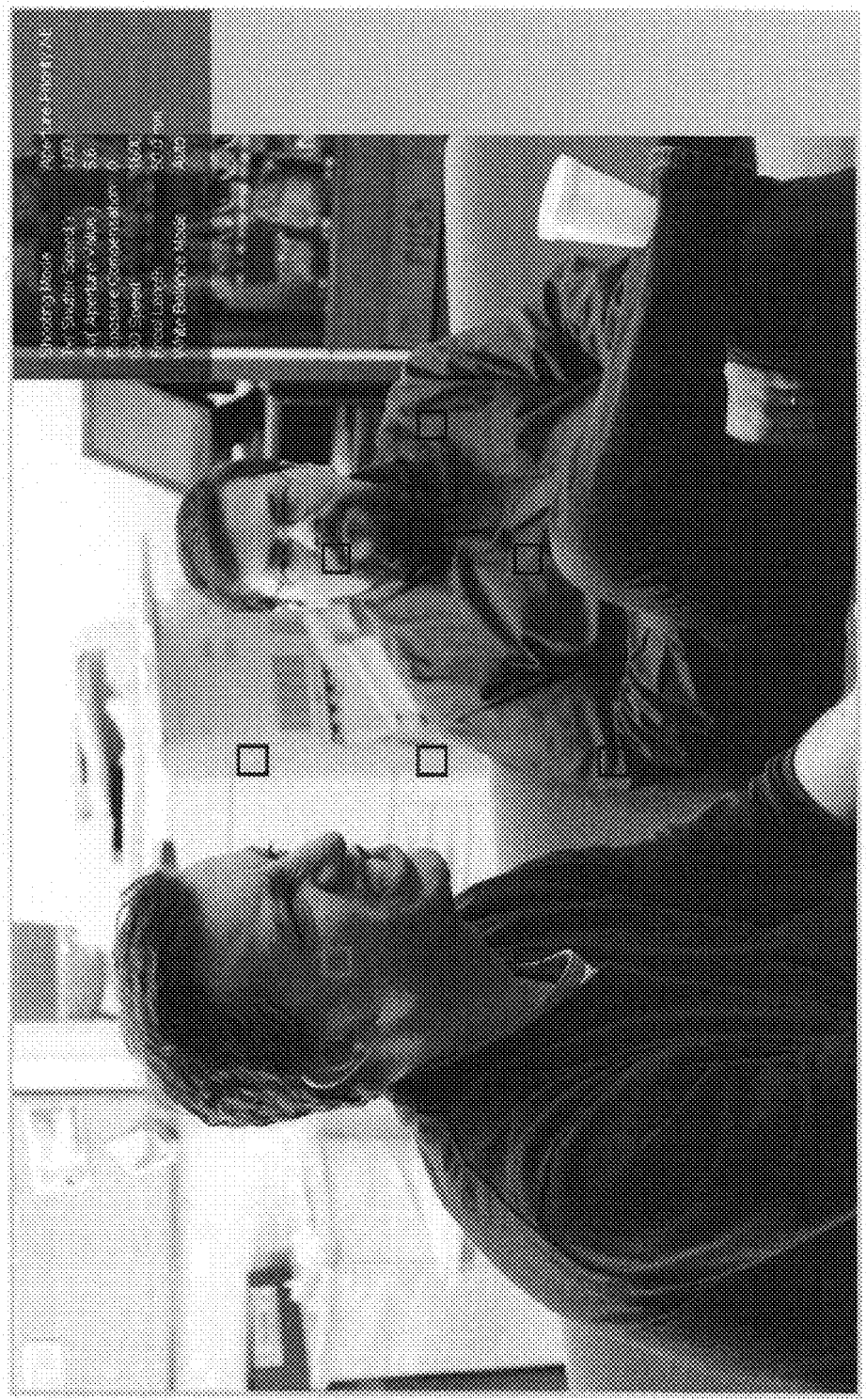
FIG. 5A and FIG. 5B show another view seen in a conventional view finder, where the camera automatically selects which focus points are used to determine focus of the photograph.
Figure 5B:
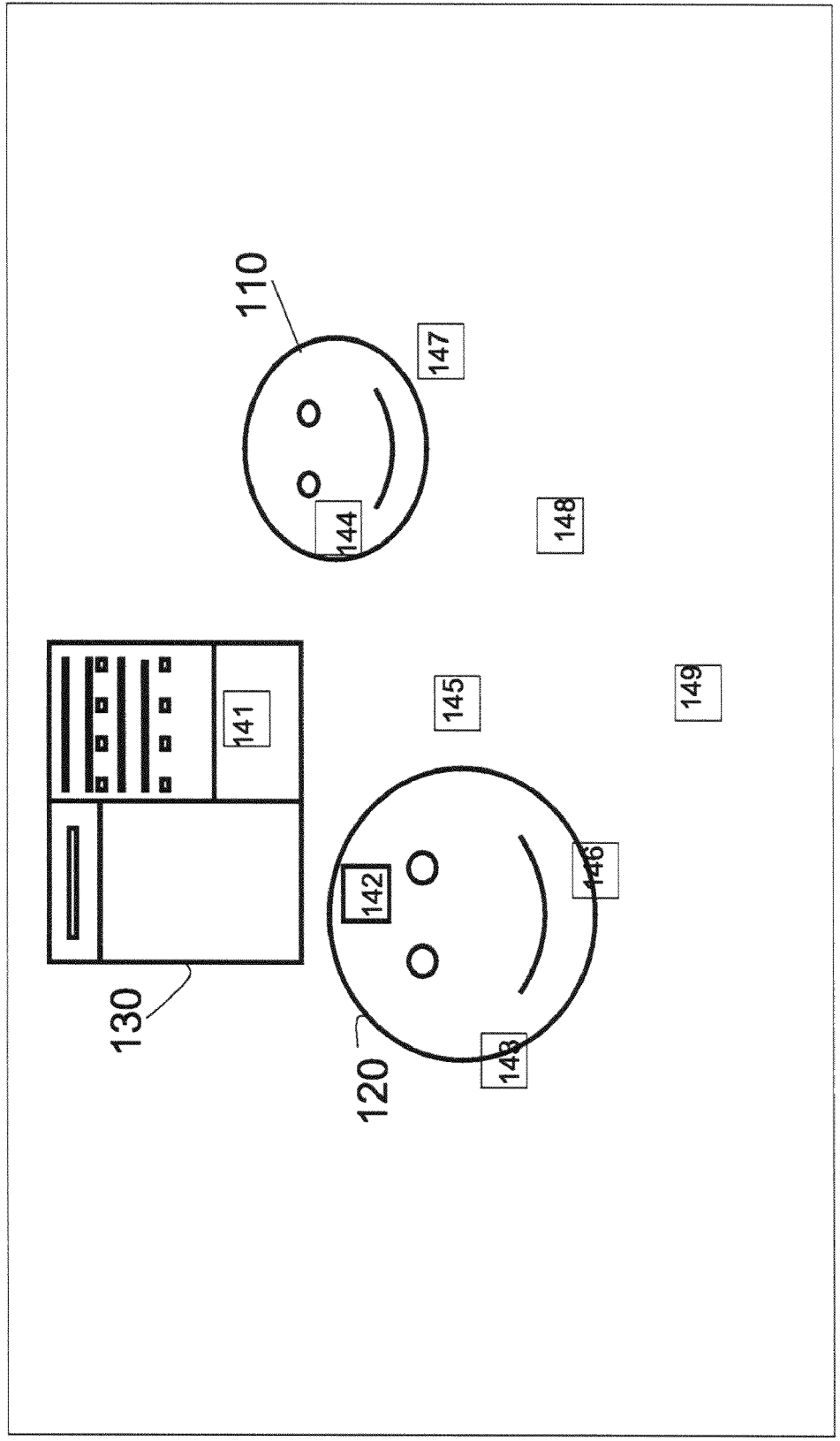

FIG. 5A and FIG. 5B show a view seen in a conventional view finder, where the camera automatically selects which focus points are used to determine focus of the photograph.

In the picture shown in FIG. 5A and caricaturized in FIG. 5B, the camera is no longer permitted to automatically choose multiple ones of the autofocus points for setting the focus. Instead, the photographer sets the focus on the near subject 120, corresponding to autofocus point 142, and the aperture is increased to have an f-number of 5.6. A single point is selected by the user.

With focus on the near subject 120 and an aperture having an f-number of 5.6, both far and near subjects 110, 120 are in focus, and the background including the background item 130 is blurry. However, the f-number of 5.6 was a guess by the photographer; an even wider aperture having an f-number of 3.5 may have been used instead still yielding an in-focus image of subjects 110, 120 and making the background item 130 even more blurry.

For the picture shown in FIG. 5A, the shooting mode is set to Aperture Priority AE and the Av (aperture value) is 5.6. The other merely exemplary values shown on the picture correspond to parameters such as the Tv (shutter speed) that is 1/30, the Exposure Compensation that is 0, the ISO speed that is 1600, the focal length that is 50.0 mm and the White Balance Mode that is Auto.

Figure 6:
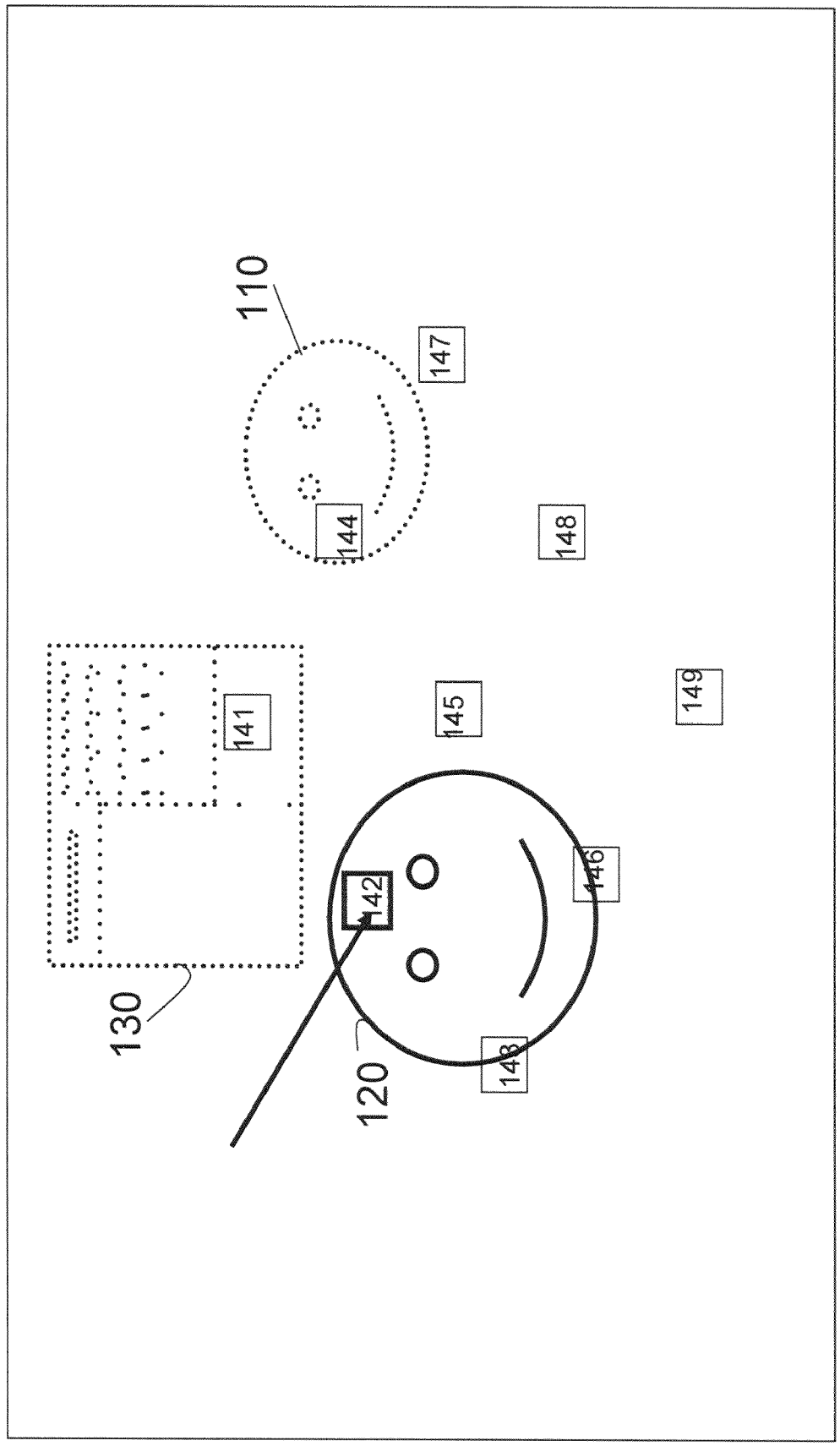
FIG. 6 shows a selection of a first point of focus in a view seen in a view finder where the focus points are selected by the photographer from autofocus points that are hard-coded, according to aspects of the present invention.

FIG. 6 shows a selection of a first point of focus in a view seen in a view finder, according to aspects of the present invention, where the focus points are selected by the photographer from autofocus points that are hard-coded.

Figure 7:
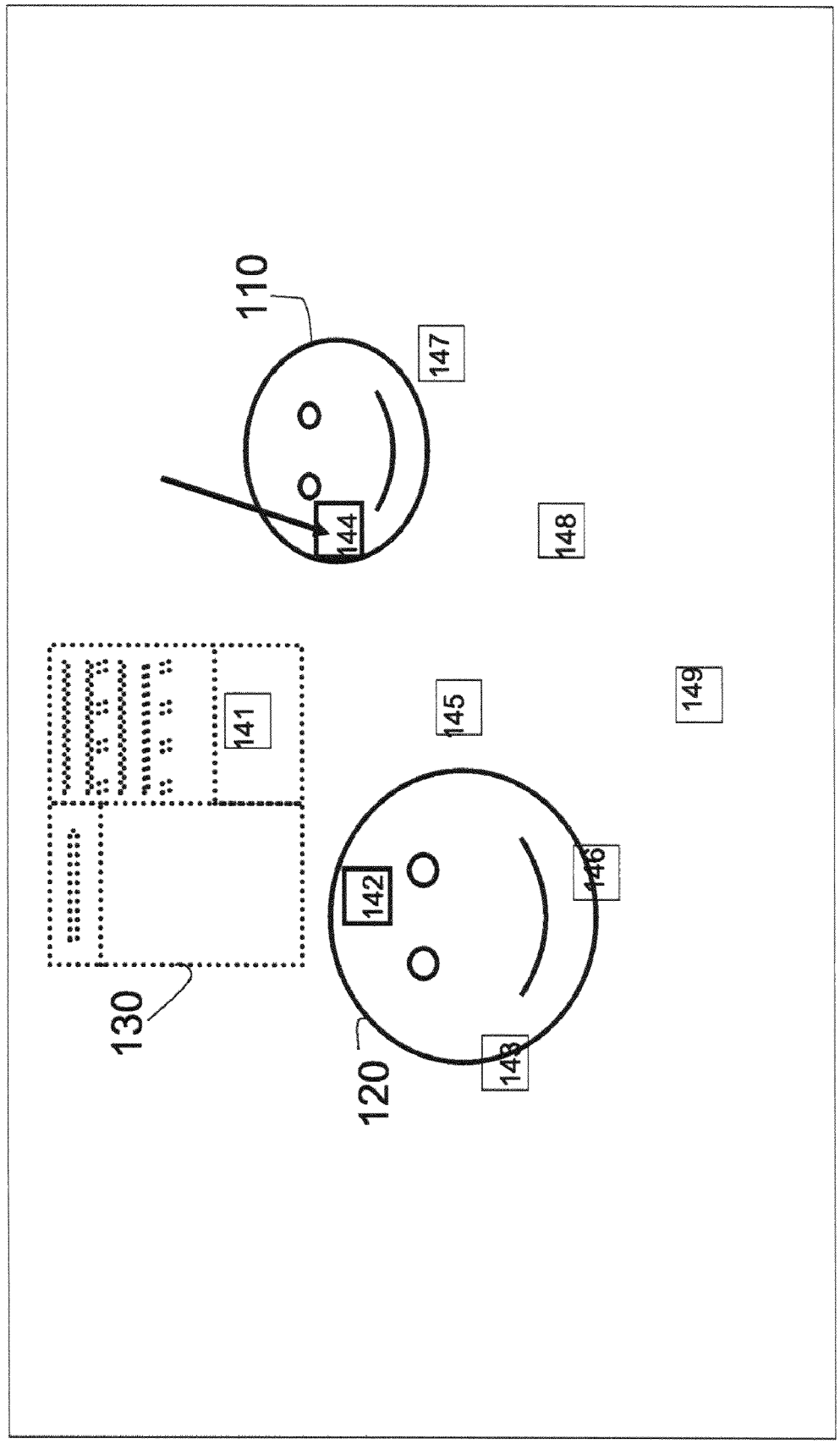
FIG. 7 shows a selection of an additional point of focus in a view seen in a view finder where the focus points are selected by the photographer from autofocus points that are hard-coded, according to aspects of the present invention.

FIG. 7 shows a selection of an additional point of focus in a view seen in a view finder, according to aspects of the present invention, where the focus points are selected by the photographer from autofocus points that are hard-coded.

Aspects of the present invention allow the photographer to manually select some or all of the autofocus points provided by the camera. In the example shown in the above drawings, the camera automatically provides the nine autofocus points 141, 142, 143, 144, 145, 146, 147, 148 and 149. The photographer can manually select some or all of the provided autofocus points to be actually used in focusing the photograph. Further, the photographer may deselect some of the points he previously selected. Yet, in another alternative shown in FIG. 8A, FIG. 8B, FIG. 9A and FIG. 9B, the photographer may select a zone or a region without having access to automatically provided autofocus points.

In one exemplary embodiment, the process of manual selection of arbitrarily selected points is demonstrated on a viewfinder including a touch screen capability.

In FIG. 6, the photographer touches the viewfinder screen on the near subject 120. By doing so, the autofocus point 142 that corresponds to the near subject 120 is selected from among the autofocus points provided automatically by the camera. In FIG. 7, the photographer touches the viewfinder screen on the far subject 110. By doing so, the autofocus point 144 that corresponds to the far subject 110 is selected from among the autofocus points provided automatically by the camera. The camera would then focus on these two subjects only and leaves the background item 130 blurry as desired by the photographer.

The input may be provided to the camera by touching the screen of the viewfinder or in some other manner such as holding down a multi-lock button as each new point of focus is selected.

The nine autofocus points automatically determined and provided by the camera may or may not be visible to the photographer. When the autofocus points are visible to the photographer, the photographer may simply select those that lie over or near the subjects of interest to the photographer. When the autofocus points are not visible to the photographer, he may still provide an input to the camera regarding the regions of interest. The camera may then find and select the automatically provided autofocus points that reside within or in the vicinity of the selected regions of interest.

Alternatively, as shown below, the photographer may select points or zones or even arbitrary regions, simply by pressing or swiping a finger across the touch-sensitive screen without the camera having selected any autofocus points ahead of the input by the photographer.

Presently available cameras only allow manual selection of a single built-in autofocus point or a single region of contiguous autofocus points, or have the capability to automatically select multiple points. Existing cameras may also include a capability for sequentially focusing at two different distances, based on a single in-camera focus point (e.g. DEP mode). The presently available cameras do not allow manual selection of arbitrarily chosen multiple points from among the autofocus points provided by the camera. Furthermore, the application of manual multiple-point pre-selection (and simultaneous locking) encompasses not only focus, but also metering, white balance and other features included in the automatic camera. In other words, metering and white balance may be adjusted based on the values from the selected points alone.

Some existing approaches for the autofocus example, and how the approach of the aspects of the present invention differs from each one are further described here.

The user selection mechanism permits manual selection of a single region only. The selected region is locked simultaneously with the selection and the type of the region is hard-coded in the camera. The position of the aforesaid hard-coded region is fixed in the viewfinder and the user can activate only one region of multiple predetermined hard-coded regions having fixed position in the viewfinder. The location of the hard-coded region in the viewfinder is determined by the manufacturer of the camera.

The automatic depth of field selection mechanism permits automatic selection of multiple regions. The selected regions are selected and locked simultaneously. The type of the region is hard-coded or may be arbitrary.

The depth of field, DEP, selection mechanism permits manual focus (or metering) at multiple distances, but is nevertheless based on a single metering or focus point. The multiple focus distances are locked and processed sequentially, rather than simultaneously. The type of the region is hard-coded.

The selection mechanism according to aspects of the present invention permits manual selection of multiple regions. The multiple regions may be selected simultaneously or sequentially. The selected regions are locked simultaneously. The points or regions that are capable of being selected, within a grid of elements that comprise a camera's evaluative matrix (and represented to the user in a viewfinder or other display), may be hard-coded (pre-defined, selectable regions) or any point, pixel, or group of pixels. A hard-coded region would be indicated on the viewfinder by, for example, showing squares corresponding to hard-coded regions. When regions are not hard-coded, and all points are available, the user may select any point, via for example a touch screen.

The focus distances, selected by the user, must be measured (metered) sequentially in the conventional depth of field mode. The method of using the depth of field mode is described as: point the camera at either the nearest or farthest object in the scene that you wish to be in focus and lightly press the shutter release; next, point the camera at the other extreme and once again half press the release; the camera will now autofocus the lens to the hyperfocal distance and will display the aperture that it has selected to achieve optimum depth of field; and last, reframe the scene and press the shutter release to take the photograph. In other words, a first point is selected, and then a button is pushed by the user to tell the camera that a point has been selected, then a second point is selected and the button is pushed again. This sequential measurement in the depth of field mode is in contrast to the aspects of the present invention that permit manual pre-selection, and then simultaneous measurement, of all the desired points. Using the aspects of the present invention, if the subjects of the photograph or movie, move nearer or farther, the focus points do not have to be reselected by the photographer. The camera already knows what regions to use, and can automatically refocus using the same points.

In other words, in the conventional depth of field mode, DEP, the measurements of the actual focus distances occur sequentially, because the user has only a single focus, or measuring, point available. When using the aspects of the present invention, even when the user has sequentially selected the points, ahead of time, by the time the camera is actually using those points, the focus measurement happens simultaneously (that is, in parallel). DEP does not allow for simultaneous measurements. Aspects of the present invention do.

The conventional automatic depth of field mode, A-DEP, is a variation on the conventional depth of field mode where the camera automatically picks the points to use. Automatic selection by the camera raises additional issues that were mentioned above. Focus distance measurement happens simultaneously, but the photographer does not have any control over which points are used for measurement. For example, the camera may select a background item that the photographer would rather leave blurry.

Photographers sometimes need better control over multiple focus points and metering zones. Multiple subjects, that are subjects of the photograph, can be at different focal distances, and image regions can be in different types or levels of light. Conventional cameras do not allow a photographer to manually specify multiple focus or metering points; in manual mode they only allow single point or region selection. In automatic mode, conventional cameras do allow multiple point selection, but the photographer is given no direct control over those points. Currently, photographers may also use a single point or region to sequentially sample multiple aspects of a scene by moving the camera lens around. However, by the time, the photograph is actually being taken by the camera, the objects at the selected multiple points may have moved and may no longer be in focus. Aspects of the present invention allow the photographer to manually select multiple arbitrary points, a priori, and retain the ability to autofocus using those points even as the subjects in the scene move around.

Aspects of the present invention address this issue by enabling manual, arbitrary, multiple-point or multiple-region selection. Aspects of the present invention allow the user to manually select or control which points and zones are used for focus, metering, and white balance in order to obtain better quality photographs. Aspects of the present invention further include a touch screen feature that allows the user to touch the parts of the image that he wishes to be in focus, correctly metered, or correctly balanced, or otherwise correctly measured.

By providing better region of interest data, this invention will enable an automatic camera to more accurately adjust these settings in order to keep desired subjects in focus by adjusting the aperture; to more accurately meter a scene; to more accurately achieve correct white balance for a scene; or to adjust any other setting that depends upon the analysis of multiple regions of interest.

Figure 8A:
FIG. 8A and FIG. 8B show a selection of a first point of focus in a view seen in a view finder where the first point is arbitrarily selected by the photographer, according to aspects of the present invention.
Figure 8B:
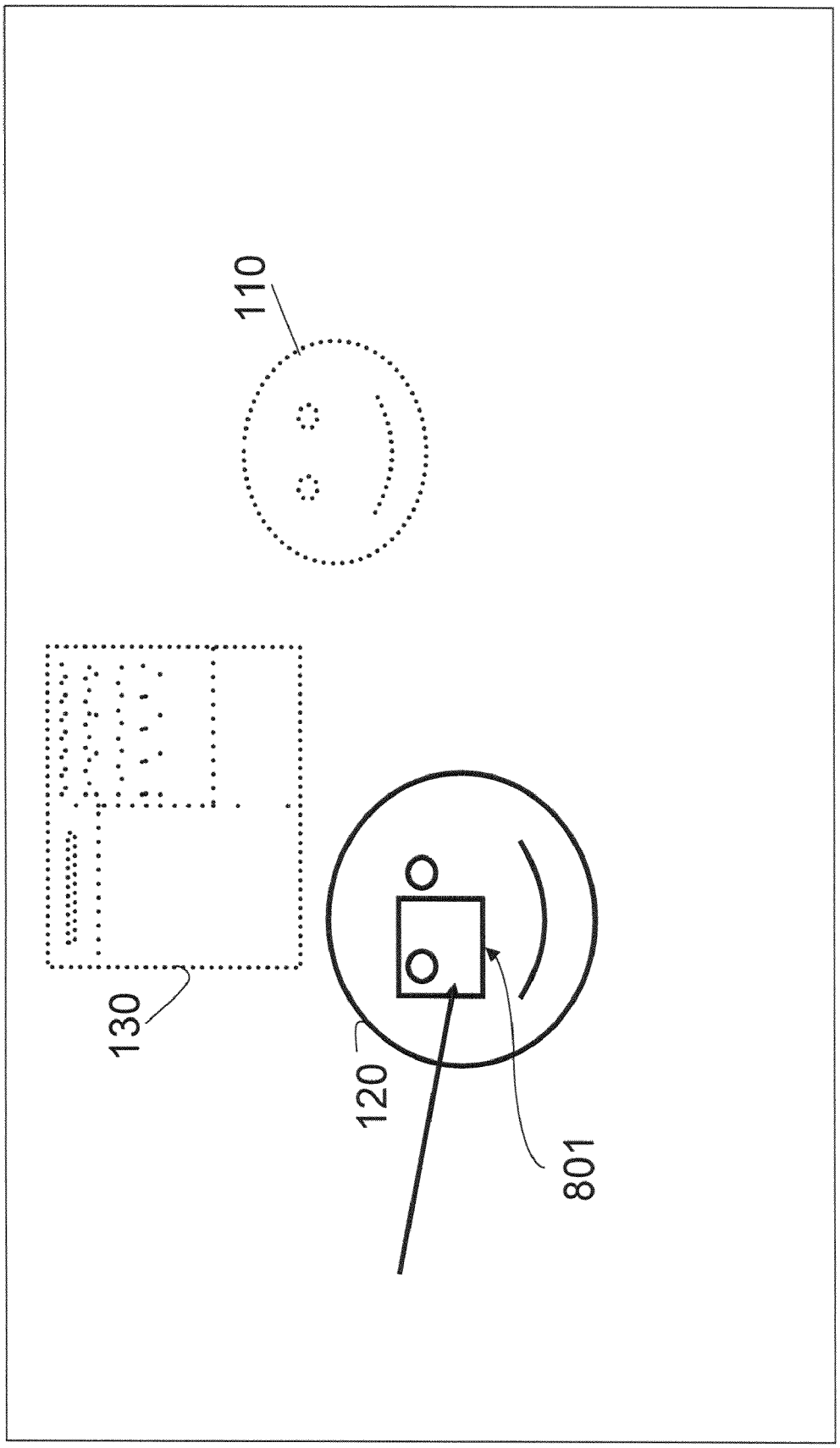
Figure 9A:
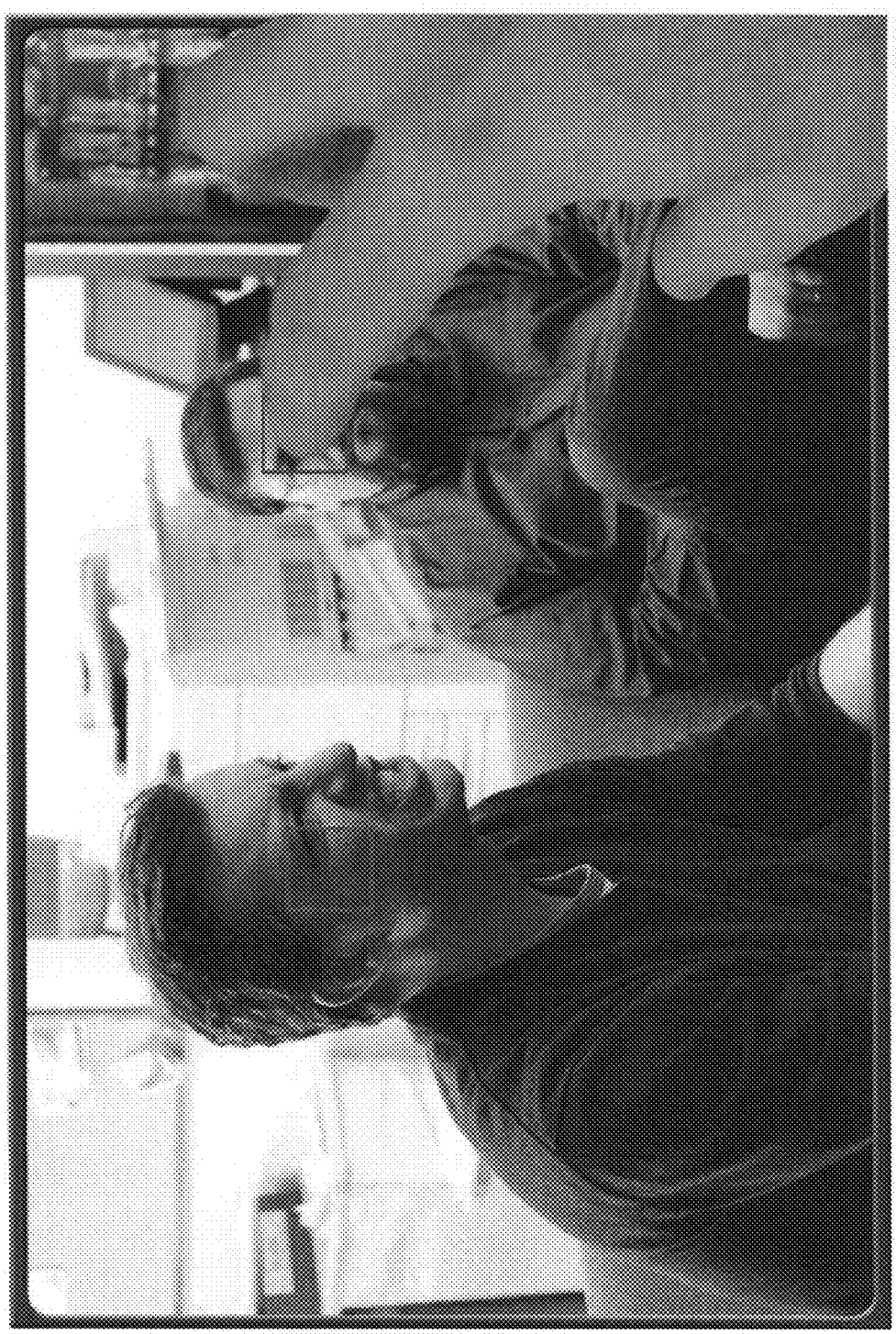
FIG. 9A and FIG. 9B show a selection of an additional point of focus in a view seen in a view finder where the additional point is arbitrarily selected by the photographer, according to aspects of the present invention.
Figure 9B:
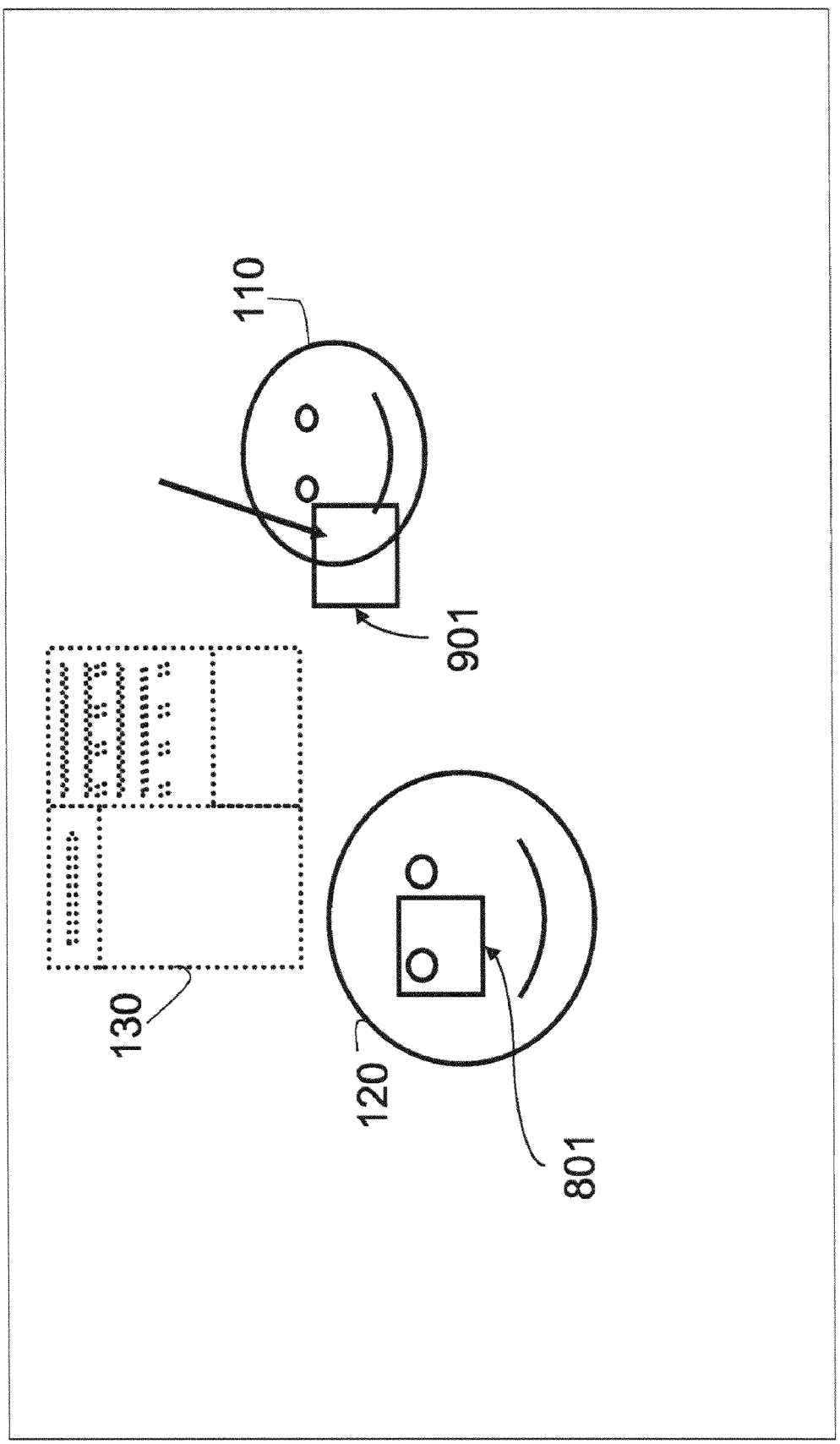

FIG. 8A and FIG. 8B show a selection of a first point of focus in a view seen in a view finder, according to aspects of the present invention, where the first point is arbitrarily selected by the photographer. FIG. 9A and FIG. 9B show a selection of an additional point of focus in a view seen in a view finder, according to aspects of the present invention, where the additional point is arbitrarily selected by the photographer.

In FIG. 8A, FIG. 8B, FIG. 9A and FIG. 9B, the first point and the second or additional points are selected arbitrarily by the photographer without having autofocus points provided to him on the view finder.

FIG. 8A, FIG. 8B, FIG. 9A and FIG. 9B pertain to an alternative aspect of the present invention where a photographer may select arbitrary points on the viewfinder that are used by the camera as focus points. In FIG. 8B, the user touches an arbitrary point 801 on the screen. In FIG. 9B, the user touches another arbitrary point 901 on the screen. Selection may be provided by other means as well. The points or regions 801 and 901 are used by the camera as the focus points. In this aspect of the present invention, autofocus points were not provided or hard-coded and may be chosen arbitrarily.

Figure 10:
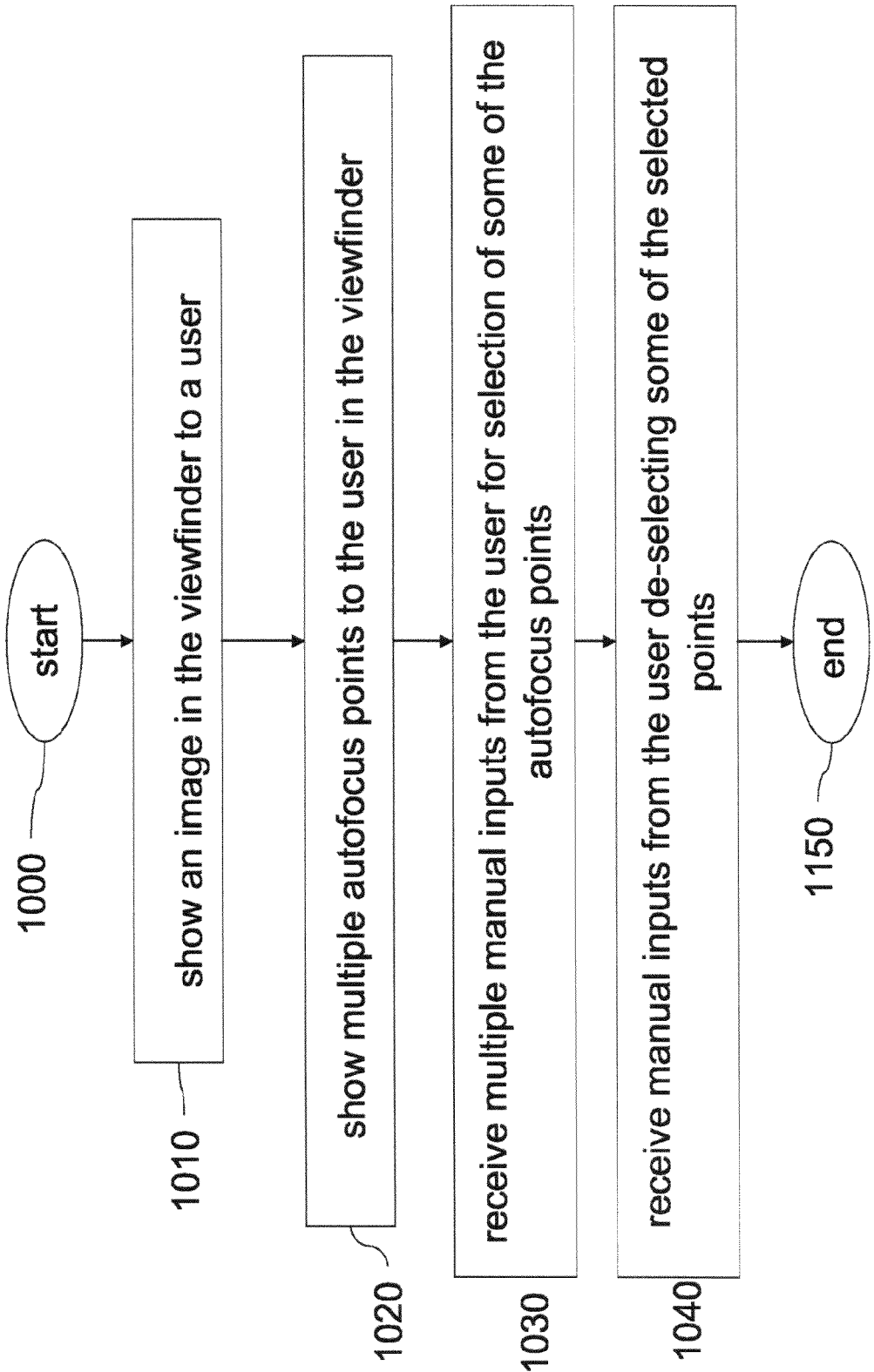
FIG. 10 shows a flow chart of a method of selecting and de-selecting multiple points of focus when autofocus points are hard-coded, according to aspects of the present invention.

FIG. 10 shows a flow chart of a method of selecting and de-selecting multiple points of focus when autofocus points are hard-coded, according to aspects of the present invention.

Figure 11:
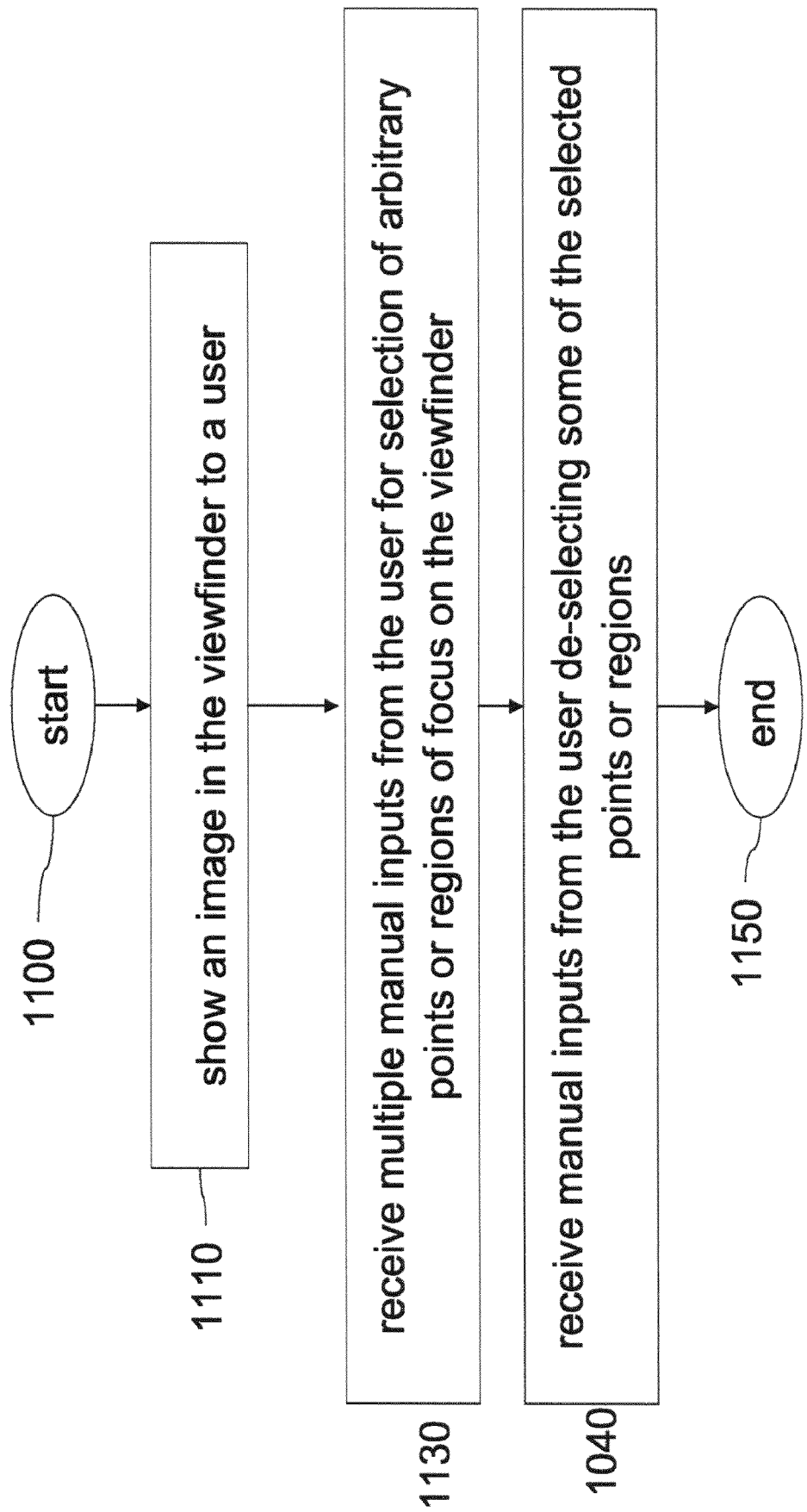
FIG. 11 shows a flow chart of a method of selecting and deselecting multiple points of focus when selections are arbitrary, according to aspects of the present invention.

The method of FIG. 10 begins at 1000. At 1010, an image is shown to a user in a viewfinder of a camera. At 1020, multiple autofocus points on the image are provided to the user by the camera. The autofocus points are hard-coded. This step is omitted in FIG. 11 that pertains to arbitrary autofocus points. At 1030, the viewfinder receives multiple manual inputs from the user indicating to the viewfinder which of the autofocus points are selected by the user and form the selected points. The selection and de-selection process may be carried out simultaneously or sequentially but all the selected points are provided to the camera in parallel; use of the points by the camera for measurement of a scene happens simultaneously. So, the selection is effectively a parallel selection. Alternatively, as shown in FIG. 11, the user may select arbitrary zones or regions of the viewfinder without the aid of autofocus points. At the same stage of 1030, the viewfinder locks the selected points simultaneously with the selection of these points by the user. At 1040, the method ends.

FIG. 11 shows a flow chart of a method of selecting and deselecting multiple points of focus when selections are arbitrary, according to aspects of the present invention.

The method of FIG. 11 begins at 1100. At 1110, an image is shown to a user in a viewfinder of a camera. In this method autofocus points are not provided to the user by the camera. At 1130, the viewfinder receives multiple manual inputs from the user indicating to the viewfinder which regions of the viewfinder are selected by the user and form the selected points. The selection may be in parallel or sequential but all selected points or regions are provided to the camera in parallel. At the same stage of 1130, the viewfinder may lock the selected points for parallel, or simultaneous, input to the camera. At 1140, the viewfinder may de-select some of the selected points if the user re-selects these points, for example, by touching the points again. The results of the process of selecting and de-selecting are also provided to the camera in parallel. At 1150, the method ends. The method of FIG. 11 is applicable to viewfinders that do not provide autofocus points to aid the user in his selection of the selected points.

Figure 12:
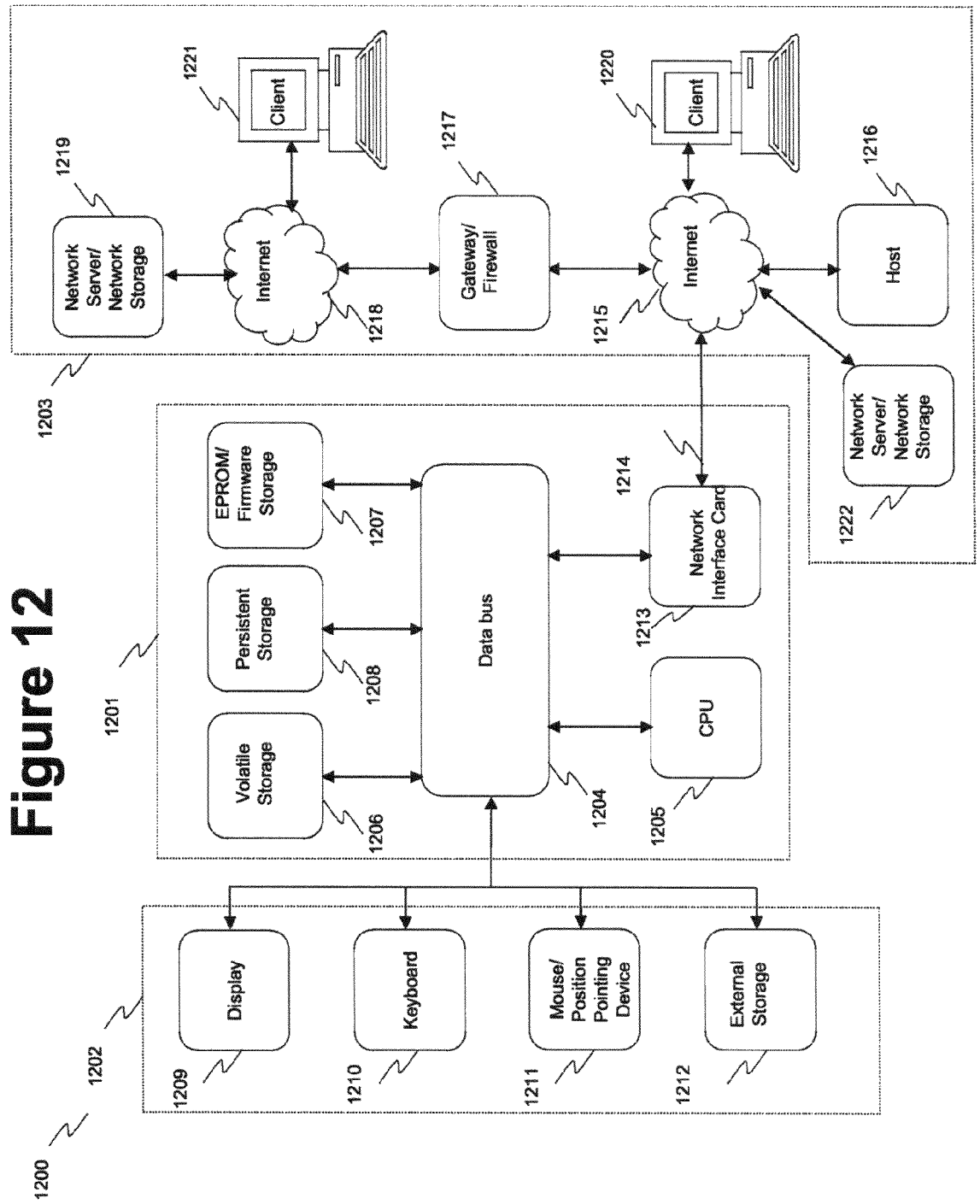
FIG. 12 illustrates an exemplary embodiment of a computer platform upon which the inventive system may be implemented.

FIG. 12 is a block diagram that illustrates an embodiment of a computer/server system 1200 upon which an embodiment of the inventive methodology may be implemented. The system 1200 includes a computer/server platform 1201, peripheral devices 1202 and network resources 1203.

The computer platform 1201 may include a data bus 1204 or other communication mechanism for communicating information across and among various parts of the computer platform 1201, and a processor 1205 coupled with bus 1201 for processing information and performing other computational and control tasks. Computer platform 1201 also includes a volatile storage 1206, such as a random access memory (RAM) or other dynamic storage device, coupled to bus 1204 for storing various information as well as instructions to be executed by processor 1205. The volatile storage 1206 also may be used for storing temporary variables or other intermediate information during execution of instructions by processor 1205. Computer platform 1201 may further include a read only memory (ROM or EPROM) 1207 or other static storage device coupled to bus 1204 for storing static information and instructions for processor 1205, such as basic input-output system (BIOS), as well as various system configuration parameters. A persistent storage device 1208, such as a magnetic disk, optical disk, or solid-state flash memory device is provided and coupled to bus 1201 for storing information and instructions.

Computer platform 1201 may be coupled via bus 1204 to a display 1209, such as a cathode ray tube (CRT), plasma display, or a liquid crystal display (LCD), for displaying information to a system administrator or user of the computer platform 1201. An input device 1210, including alphanumeric and other keys, is coupled to bus 1201 for communicating information and command selections to processor 1205. Another type of user input device is cursor control device 1211, such as a mouse, a trackball, or cursor direction keys for communicating direction information and command selections to processor 1204 and for controlling cursor movement on display 1209. This input device typically has two degrees of freedom in two axes, a first axis (e.g., x) and a second axis (e.g., y), that allows the device to specify positions in a plane.

An external storage device 1212 may be connected to the computer platform 1201 via bus 1204 to provide an extra or removable storage capacity for the computer platform 1201. In an embodiment of the computer system 1200, the external removable storage device 1212 may be used to facilitate exchange of data with other computer systems.

The present invention is related to the use of computer system 1200 for implementing the techniques described herein. In an embodiment, the inventive system may reside on a machine such as computer platform 1201. According to one embodiment of the present invention, the techniques described herein are performed by computer system 1200 in response to processor 1205 executing one or more sequences of one or more instructions contained in the volatile memory 1206. Such instructions may be read into volatile memory 1206 from another computer-readable medium, such as persistent storage device 1208. Execution of the sequences of instructions contained in the volatile memory 1206 causes processor 1205 to perform the process steps described herein. In alternative embodiments, hard-wired circuitry may be used in place of or in combination with software instructions to implement the present invention. Thus, embodiments of the present invention are not limited to any specific combination of hardware circuitry and software.

The term "computer-readable medium" as used herein refers to any medium that participates in providing instructions to processor 1205 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 1208. Volatile media includes dynamic memory, such as volatile storage 1206. Transmission media includes coaxial cables, copper wire and fiber optics, including the wires that comprise data bus 1204. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 705 for execution. For example, the instructions may initially be carried on a magnetic disk from a remote computer. Alternatively, a remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on the data bus 1204. The bus 1204 carries the data to the volatile storage 1206, from which processor 1205 retrieves and executes the instructions. The instructions received by the volatile memory 1206 may optionally be stored on persistent storage device 1208 either before or after execution by processor 1205. The instructions may also be downloaded into the computer platform 1201 via Internet using a variety of network data communication protocols well known in the art.

The computer platform 1201 also includes a communication interface, such as network interface card 1213 coupled to the data bus 1204. Communication interface 1213 provides a two-way data communication coupling to a network link 1214 that is connected to a local network 1215. For example, communication interface 1213 may be an integrated services digital network (ISDN) card or a modem to provide a data communication connection to a corresponding type of telephone line. As another example, communication interface 1213 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 1213 sends and receives electrical, electromagnetic or optical signals that carry digital data streams representing various types of information.

Network link 1213 typically provides data communication through one or more networks to other network resources. For example, network link 1214 may provide a connection through local network 1215 to a host computer 1216, or a network storage/server 1217. Additionally or alternatively, the network link 1213 may connect through gateway/firewall 1217 to the wide-area or global network 1218, such as an Internet. Thus, the computer platform 1201 can access network resources located anywhere on the Internet 1218, such as a remote network storage/server 1219. On the other hand, the computer platform 1201 may also be accessed by clients located anywhere on the local area network 1215 and/or the Internet 1218. The network clients 1220 and 1221 may themselves be implemented based on the computer platform similar to the platform 1201.

Local network 1215 and the Internet 1218 both use electrical, electromagnetic or optical signals that carry digital data streams. The signals through the various networks and the signals on network link 1214 and through communication interface 1213, which carry the digital data to and from computer platform 1201, are exemplary forms of carrier waves transporting the information.

Computer platform 1201 can send messages and receive data, including program code, through the variety of network (s) including Internet 1218 and LAN 1215, network link 1214 and communication interface 1213. In the Internet example, when the system 1201 acts as a network server, it might transmit a requested code or data for an application program running on client(s) 1220 and/or 1221 through Internet 1218, gateway/firewall 1217, local area network 1215 and communication interface 1213. Similarly, it may receive code from other network resources.

The received code may be executed by processor 1205 as it is received, and/or stored in persistent or volatile storage devices 1208 and 1206, respectively, or other non-volatile storage for later execution. In this manner, computer system 1201 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the present invention will be apparent to those skilled in the art from consideration of the specification and practice of the present invention disclosed herein. Various aspects and/or components of the described embodiments may be used singly or in any combination in the inventive camera focusing system. It is intended that the specification and examples be considered as exemplary only, with a true scope and spirit of the present invention being indicated by the following claims and their equivalents.

What is claimed is:

1. A method for processing of data from multiple measurement points on a viewfinder of a camera, the method comprising:
    receiving a manual selection of a first measurement point on the viewfinder at a first time;
    receiving a manual selection of a second measurement point on the viewfinder at a second time; and
    at a third time, simultaneously processing data from a scene, being viewed through the viewfinder, corresponding to the first measurement point and to the second measurement point,
    wherein the simultaneously processing is responsive to a current situation of the scene at locations corresponding to the first measurement point and to the second measurement point, the current situation corresponding to the third time.

2. The method of claim 1,
    wherein the first time and the second time are capable of being equal or different, and
    wherein the third time is capable of being equal to the second time or different from the second time.

3. The method of claim 1, wherein the first measurement point and the second measurement point on the viewfinder are selected from predetermined hard-coded points.

4. The method of claim 1,
    wherein the viewfinder includes a touch-sensitive screen, and
    wherein the first measurement point and the second measurement point are selected by the user by touching the touch-sensitive screen.

5. The method of claim 1,
    wherein the camera includes a multi-lock button, and
    wherein the first measurement point and the second measurement point are selected by the user by actuating the multi-lock button.

6. The method of claim 1, wherein the camera is selected from a digital still camera, an analog still camera, a digital motion camera or an analog motion camera.

7. The method of claim 1, wherein the first measurement point and the second measurement point are selected points and wherein the method is tied into an automatic focus feature of the camera, the method further comprising:
    automatically adjusting a focus distance of the camera according to the selected points; and
    automatically adjusting an aperture of the camera according to the focus distance.

8. The method of claim 1, wherein the first measurement point and the second measurement point are selected points and wherein the method is tied into a light metering feature of the camera, the method further comprising:
    automatically adjusting exposure of the camera according to light detected at each of the selected points.

9. The method of claim 1, wherein the first measurement point and the second measurement point are selected points and wherein the method is tied into a white balance feature of the camera, the method further comprising:
    automatically adjusting white balance of an image generated by the camera according to white balance detected at each of the selected points.

10. The method of claim 1, wherein the first measurement point and the second measurement point are selected points, the method further comprising:
    de-selecting one of the selected points when the selected point is re-selected by the user.

11. The method of claim 1, wherein the first measurement point and the second measurement point are regions each including a plurality of contiguous points.

12. A device comprising:
   a screen for showing an image to a user;
   an input interface for receiving multiple inputs from the user, the multiple inputs indicating selected points on the device; and
   a locking means for locking the selected points,
   wherein the multiple inputs are provided to the device manually by the user, and
   wherein data corresponding to the multiple inputs are processed in parallel by the device.

13. The device of claim 12, wherein the selected points are selected from among autofocus points presented by the device.

14. The device of claim 12,
   wherein the selected points correspond to regions on the device, the regions being within a grid of elements comprising an evaluative matrix of the camera and represented to the user in the viewfinder.

15. The device of claim 12,
   wherein the input interface includes a touch-sensitive screen, and
   wherein the selected points are selected when the user touches the touch-sensitive screen.

16. The device of claim 12,
   wherein the device is included in a camera, the camera including a multi-lock button, and
   wherein the selected points are selected by actuating the multi-lock button.

17. The device of claim 12, further comprising:
   wherein one or more of the selected points are de-selected by being re-selected by the user.

18. The device of claim 12,
   wherein the device is capable of being included in a camera, and
   wherein the camera is selected from a digital or analog still camera, a digital or analog motion camera, or any combination.

19. The device of claim 12,
   wherein the device is included in a camera, and
   wherein the device is coupled to an output of at least one sensor of the camera.

20. The device of claim 12, wherein the device is tied into a light metering feature of the camera.

21. The device of claim 12, wherein the device is tied into a white balance feature of the camera.

22. The device of claim 12, wherein the device is a viewfinder.

23. A camera including the device of claim 22.

* * * * *